(12) United States Patent
Putnam et al.

(10) Patent No.: US 12,557,205 B2
(45) Date of Patent: Feb. 17, 2026

(54) METHODS FOR OPERATING A PLASMA TORCH

(71) Applicant: The ESAB Group Inc., Annapolis Junction, MD (US)

(72) Inventors: Geoffrey H. Putnam, Charlestown, NH (US); Christopher Vincent Braudis, Sr., Canaan, NH (US); Ryan Lynaugh, Cornish, NH (US)

(73) Assignee: THE ESAB GROUP INC., North Bethesda, MD (US)

( * ) Notice: Subject to any disclaimer, the term of this patent is extended or adjusted under 35 U.S.C. 154(b) by 1016 days.

(21) Appl. No.: 17/590,277

(22) Filed: Feb. 1, 2022

(65) Prior Publication Data
US 2023/0247752 A1   Aug. 3, 2023

(51) Int. Cl.
  *H05H 1/34* (2006.01)
  *B23K 9/16* (2006.01)
  *B23K 10/00* (2006.01)

(52) U.S. Cl.
  CPC ........... *H05H 1/3405* (2013.01); *B23K 9/164* (2013.01); *B23K 10/00* (2013.01)

(58) Field of Classification Search
  CPC .......... B23K 9/164; B23K 10/00; H05H 1/34; H05H 1/3405; H05H 1/3494
  See application file for complete search history.

(56) References Cited

U.S. PATENT DOCUMENTS

| 4,861,962 A | 8/1989 | Sanders et al. |
| 5,120,930 A | 6/1992 | Sanders et al. |

(Continued)

FOREIGN PATENT DOCUMENTS

| CN | 101175596 A | 5/2008 |
| CN | 207840380 U | 9/2018 |

(Continued)

OTHER PUBLICATIONS

Notification of Transmittal of International Search Report and Written Opinion including International Search Report and Written Opinion for International Application No. PCT/US2023/061273 dated May 15, 2023, 14 pages.

(Continued)

*Primary Examiner* — Brian W Jennison
(74) *Attorney, Agent, or Firm* — Edell, Shapiro & Finnan, LLC

(57) ABSTRACT

A method for using a plasma torch includes delivering a plasma gas through a plasma gas flow channel of a plasma torch while ionizing the plasma gas to produce a plasma arc that extends between the electrode and the workpiece. Additionally, shield fluid is delivered through a shield flow channel at a first pressure. A piercing operation to produce a pierce hole in the workpiece using the plasma arc is initiated while the shield fluid is delivered through the shield flow channel at the first pressure. After conducting the piercing operation for an amount of time, the shield fluid is delivered to the shield flow channel at a second pressure that is higher than the first pressure. Subsequent to the piercing operation, performing a cutting operation that forms a cut in the workpiece that originates at and extends away from a boundary of the pierce hole.

20 Claims, 19 Drawing Sheets

(56) References Cited

U.S. PATENT DOCUMENTS

| | | |
|---|---|---|
| 5,132,512 A | 7/1992 | Sanders et al. |
| 5,294,773 A | 3/1994 | Lambert |
| 5,396,043 A | 3/1995 | Couch, Jr. et al. |
| 5,614,110 A | 3/1997 | Shintani et al. |
| 5,653,895 A | 8/1997 | Shintani |
| 5,717,187 A | 2/1998 | Rogozinski et al. |
| 5,747,767 A | 5/1998 | Severance et al. |
| 6,069,339 A | 5/2000 | McGrath et al. |
| 6,093,905 A | 7/2000 | Hardwick et al. |
| 6,163,009 A | 12/2000 | Hardwick et al. |
| 6,207,923 B1 | 3/2001 | Lindsay |
| 6,244,927 B1 | 6/2001 | Zeng |
| 6,326,583 B1 | 12/2001 | Hardwick et al. |
| 6,914,209 B2 | 7/2005 | Yamaguchi et al. |
| 6,914,211 B2 | 7/2005 | Brasseur et al. |
| 7,015,412 B1 | 3/2006 | Uttrachi |
| 7,019,248 B1 | 3/2006 | Uttrachi |
| 7,137,544 B2 | 11/2006 | Caddell, Jr. et al. |
| 7,326,874 B2 | 2/2008 | Brasseur et al. |
| 7,605,340 B2 | 10/2009 | Duan |
| 7,737,383 B2 | 6/2010 | Hussary et al. |
| 7,829,816 B2 | 11/2010 | Duan et al. |
| 7,935,909 B2 | 5/2011 | Hussary et al. |
| 8,168,916 B2 | 5/2012 | Hussary et al. |
| 8,212,173 B2 | 7/2012 | Liebold et al. |
| 8,258,421 B2 | 9/2012 | Halvorsen et al. |
| 8,319,142 B2 | 11/2012 | Hussary et al. |
| 8,338,739 B2 | 12/2012 | Lindsay et al. |
| 8,354,608 B2 | 1/2013 | Dave et al. |
| 8,354,609 B2 | 1/2013 | Lindsay et al. |
| 8,354,610 B2 | 1/2013 | Lindsay et al. |
| 8,389,887 B2 | 3/2013 | Liebold et al. |
| 8,395,074 B2 | 3/2013 | Winn et al. |
| 8,395,077 B2 | 3/2013 | Duan et al. |
| 8,436,270 B2 | 5/2013 | Lindsay et al. |
| 8,450,637 B2 | 5/2013 | Luce et al. |
| 8,513,565 B2 | 8/2013 | Duan |
| 8,541,711 B2 | 9/2013 | Lindsay et al. |
| 8,653,417 B2 | 2/2014 | Peters |
| 8,674,256 B2 | 3/2014 | Hussary et al. |
| D702,272 S | 4/2014 | Furujo et al. |
| 8,710,395 B2 | 4/2014 | Lindsay et al. |
| 8,710,396 B2 | 4/2014 | Salsich et al. |
| 8,981,252 B2 | 3/2015 | Liebold et al. |
| 9,210,787 B2 | 12/2015 | Hussary et al. |
| 9,457,419 B2 | 10/2016 | Namburu |
| 9,572,242 B2 | 2/2017 | Namburu |
| 9,609,734 B2 | 3/2017 | Stone |
| 9,686,848 B2 | 6/2017 | Namburu |
| 9,789,561 B2 | 10/2017 | Liebold et al. |
| 9,883,575 B2 | 1/2018 | Namburu |
| 9,931,708 B2 | 4/2018 | Salsich et al. |
| 10,137,522 B2 | 11/2018 | Winn |
| 10,279,417 B2 | 5/2019 | Jogdand et al. |
| 10,322,466 B2 | 6/2019 | Namburu et al. |
| 10,328,516 B2 | 6/2019 | Salsich et al. |
| 10,335,887 B2 | 7/2019 | Hodges et al. |
| 10,589,372 B2 | 3/2020 | Kerecelidze |
| 10,722,971 B2 | 7/2020 | Mitra et al. |
| 2002/0166848 A1* | 11/2002 | Furujo ............... B23K 26/1438 219/121.72 |
| 2004/0112875 A1 | 6/2004 | Yamaguchi et al. |
| 2005/0035093 A1 | 2/2005 | Yamaguchi et al. |
| 2005/0045600 A1 | 3/2005 | Tatham |
| 2005/0077281 A1 | 4/2005 | Hamilton et al. |
| 2006/0163216 A1 | 7/2006 | Brandt et al. |
| 2006/0163220 A1 | 7/2006 | Brandt et al. |
| 2007/0158321 A1 | 7/2007 | Caddell et al. |
| 2007/0181540 A1 | 8/2007 | Lindsay |
| 2008/0006614 A1* | 1/2008 | Brandt ..................... H05H 1/34 219/121.55 |
| 2008/0210670 A1 | 9/2008 | Brandt et al. |
| 2008/0217305 A1 | 9/2008 | Sanders |
| 2009/0057276 A1 | 3/2009 | Hussary et al. |
| 2012/0145680 A1 | 6/2012 | Warren, Jr. et al. |
| 2012/0261392 A1 | 10/2012 | Barnett et al. |
| 2013/0112660 A1 | 5/2013 | Enyedy et al. |
| 2014/0110381 A1 | 4/2014 | Mather et al. |
| 2015/0014285 A1 | 1/2015 | Patel et al. |
| 2015/0342019 A1 | 11/2015 | Peters et al. |
| 2016/0136764 A1 | 5/2016 | Enyedy et al. |
| 2016/0193682 A1 | 7/2016 | Vogel et al. |
| 2017/0001255 A1* | 1/2017 | Winn .................... B23K 10/00 |
| 2017/0095877 A1 | 4/2017 | Ames et al. |
| 2017/0095878 A1 | 4/2017 | Liebold et al. |
| 2017/0095879 A1* | 4/2017 | Mitra .................... B23K 10/00 |
| 2017/0225253 A1 | 8/2017 | Matsuoka et al. |
| 2017/0295637 A1 | 10/2017 | Peters et al. |
| 2018/0084631 A1 | 3/2018 | Peters et al. |
| 2018/0095879 A1 | 4/2018 | Han et al. |
| 2018/0361497 A1 | 12/2018 | Nowak |
| 2019/0210143 A1 | 7/2019 | Jogdand et al. |
| 2021/0204387 A1 | 7/2021 | Lynaugh et al. |

FOREIGN PATENT DOCUMENTS

| | | |
|---|---|---|
| EP | 1324644 A2 | 7/2003 |
| JP | H11141822 A | 5/1999 |
| WO | 9116166 A1 | 10/1991 |
| WO | 2006126339 A1 | 11/2006 |
| WO | 2021138044 A1 | 7/2021 |

OTHER PUBLICATIONS

Notification of Transmittal of International Search Report and Written Opinion including International Search Report and Written Opinion for International Application No. PCT/US2020/065045 dated Mar. 24, 2021, 17 pages.

Examination Report No. 1 for Australian Patent Application No. 2020416708 dated Jun. 8, 2023, 4 pages.

Office Action for Canadian Patent Application No. 3,162,975 dated Aug. 9, 2023, 5 pages.

First Office Action including search report issued by CNIPA for Chinese Patent Application No. 202080091535.8 on Mar. 29, 2025 with English translation, 16 pages.

\* cited by examiner

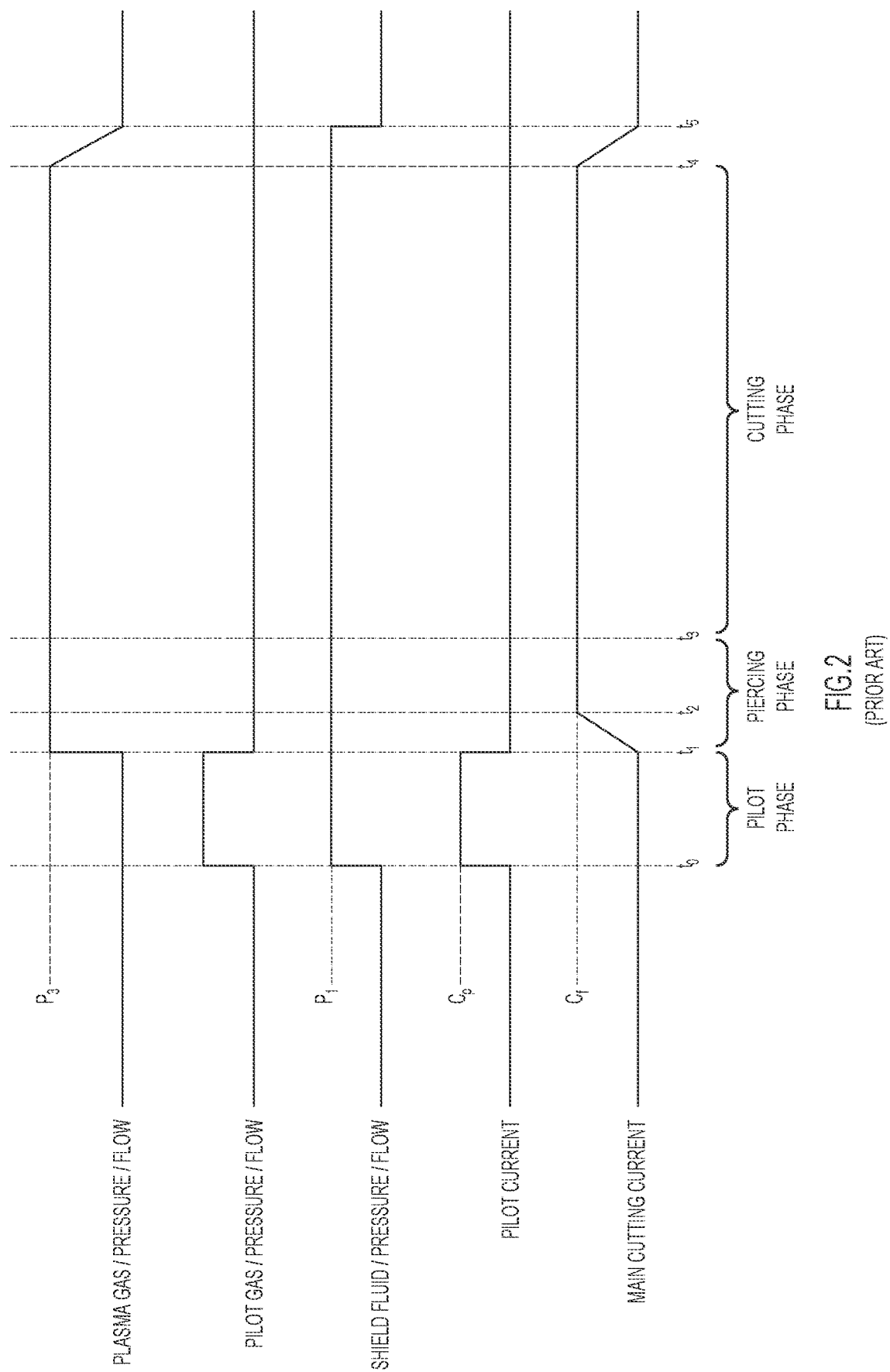

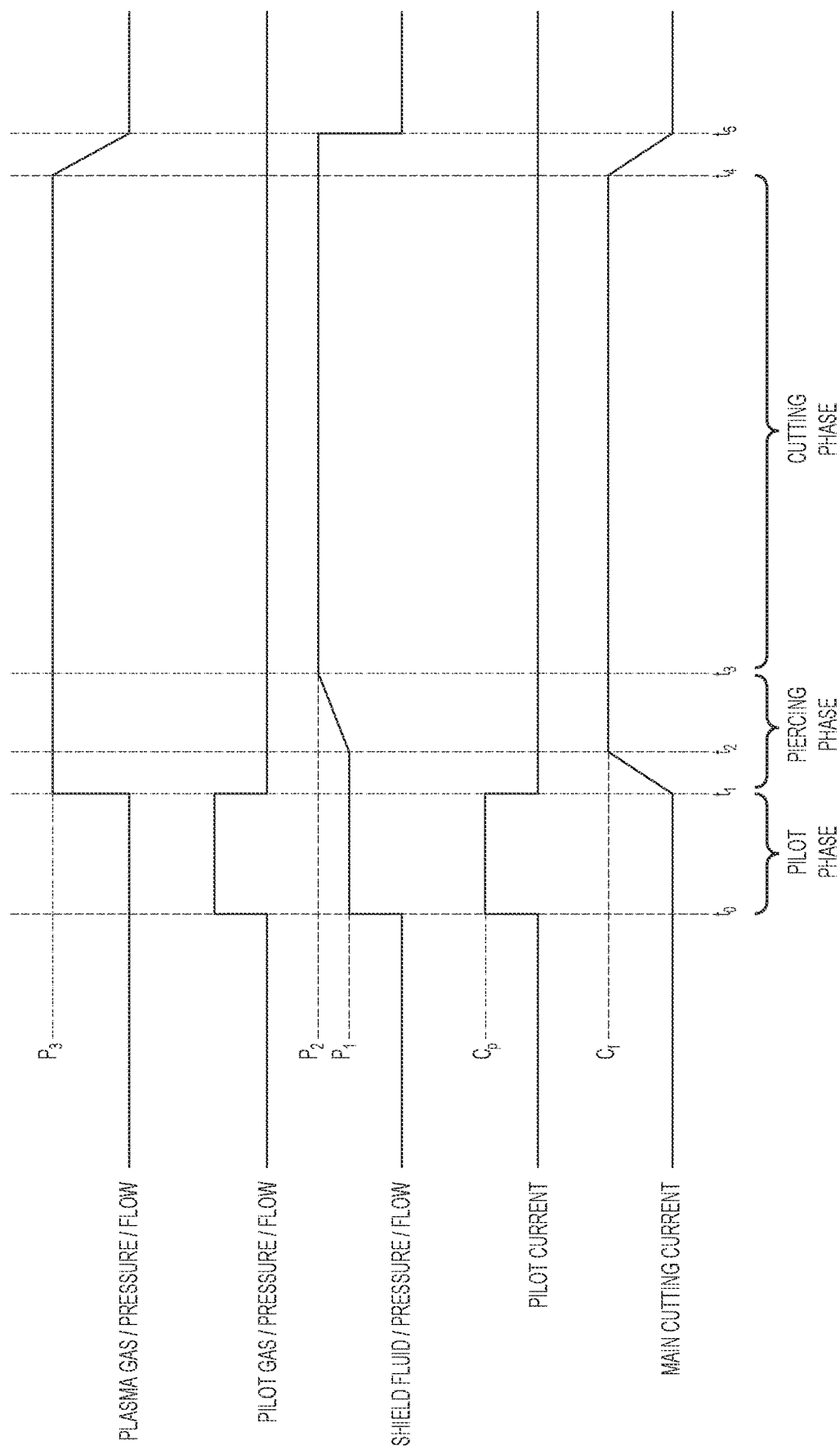

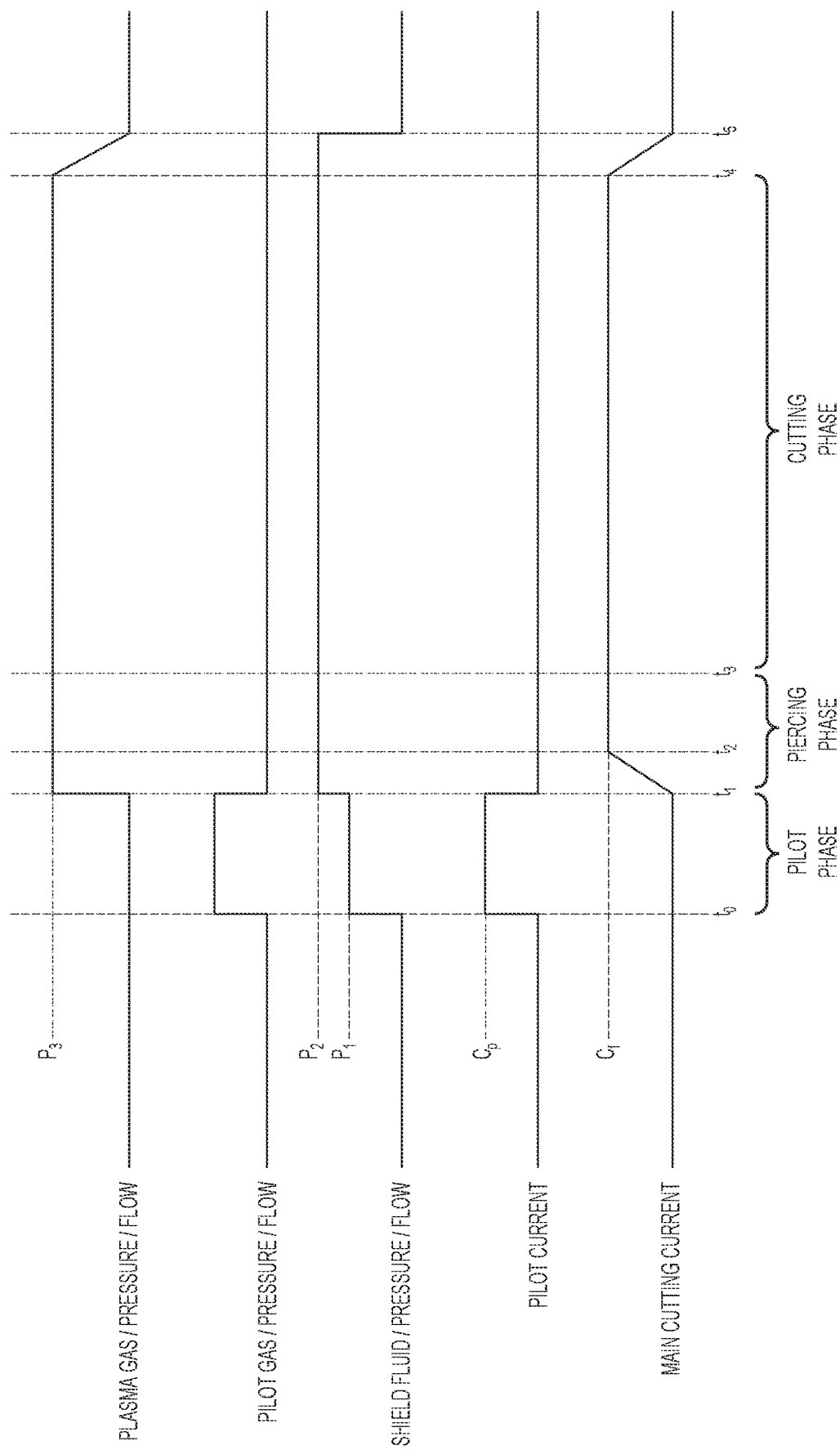

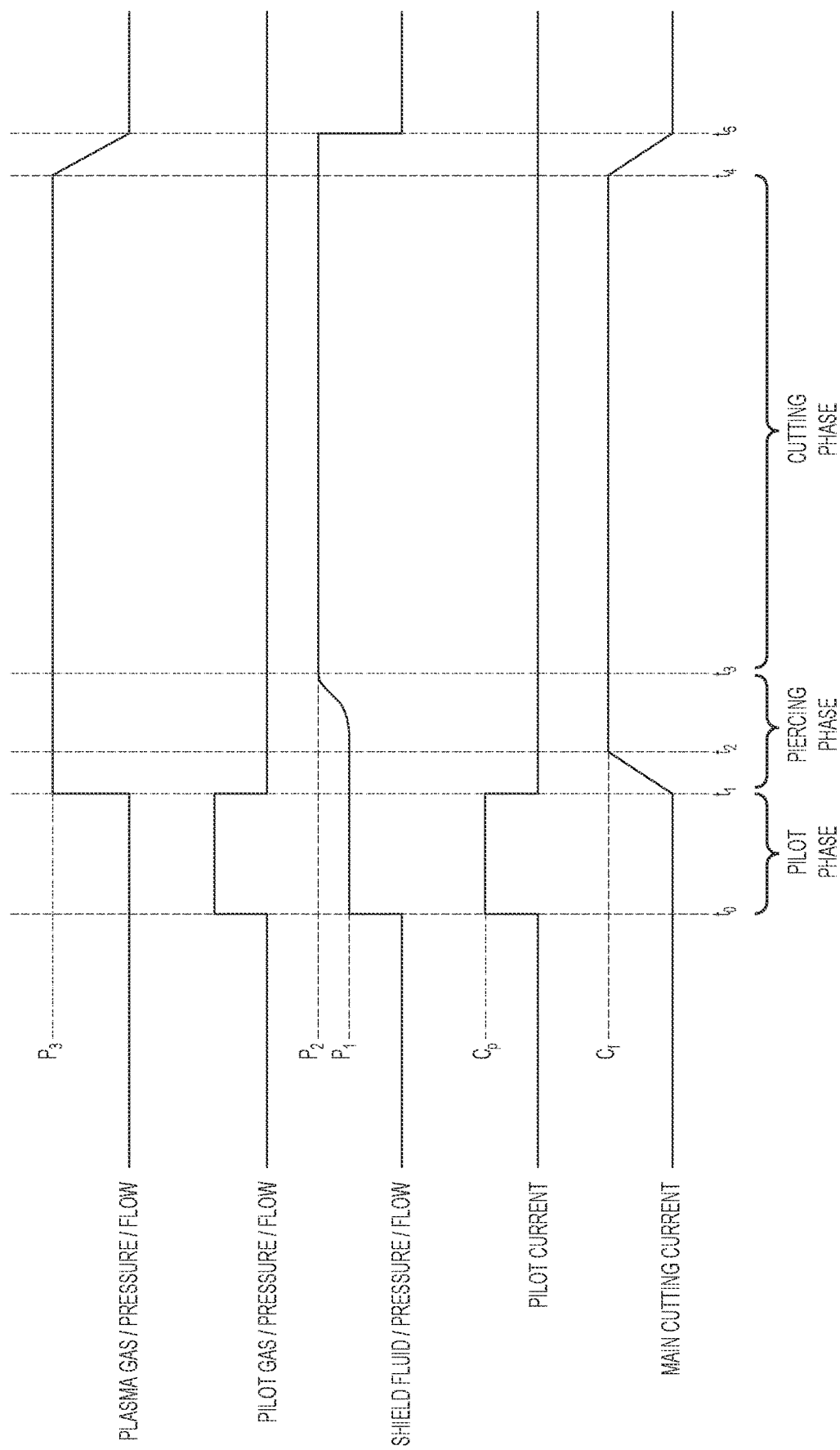

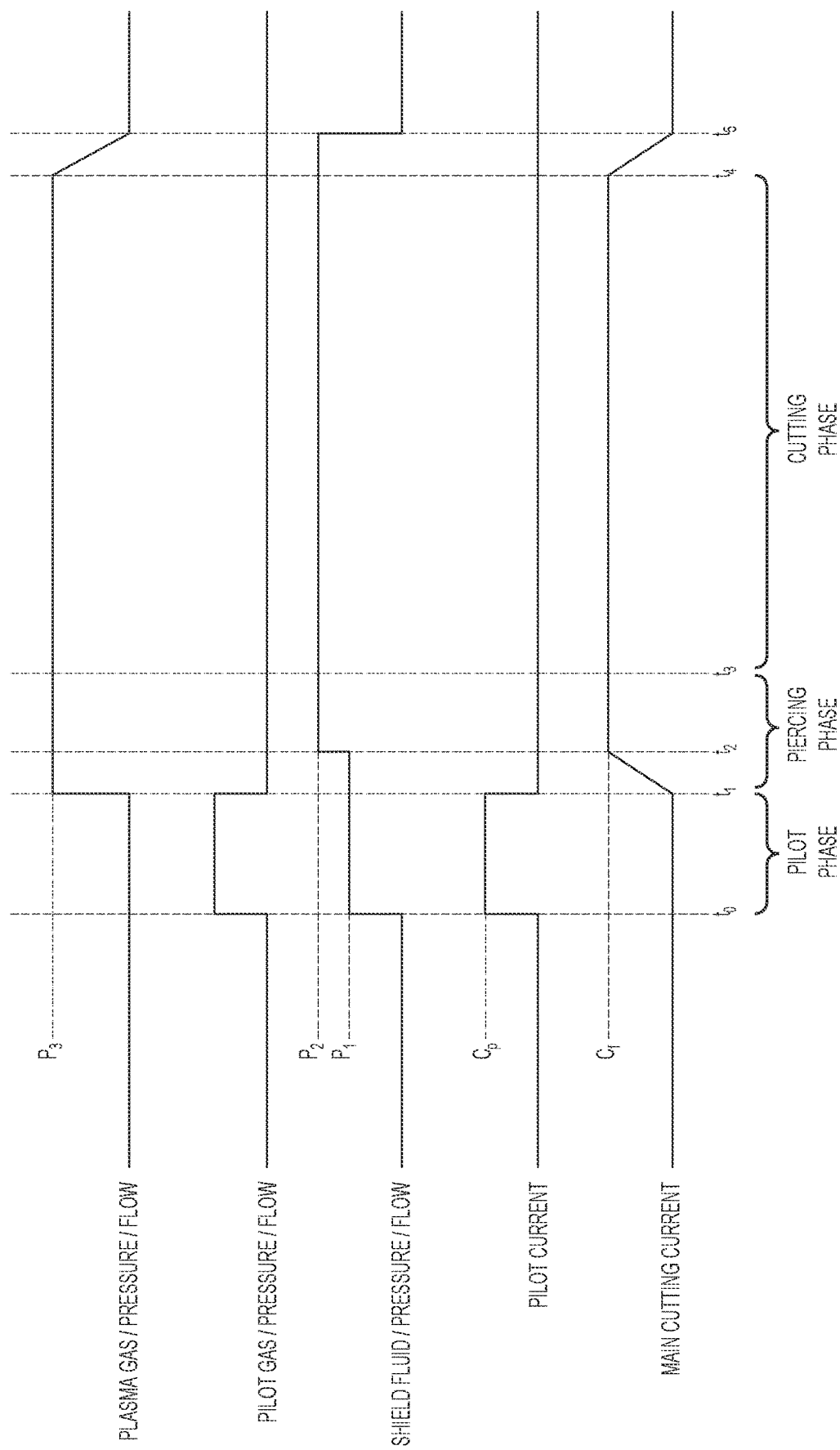

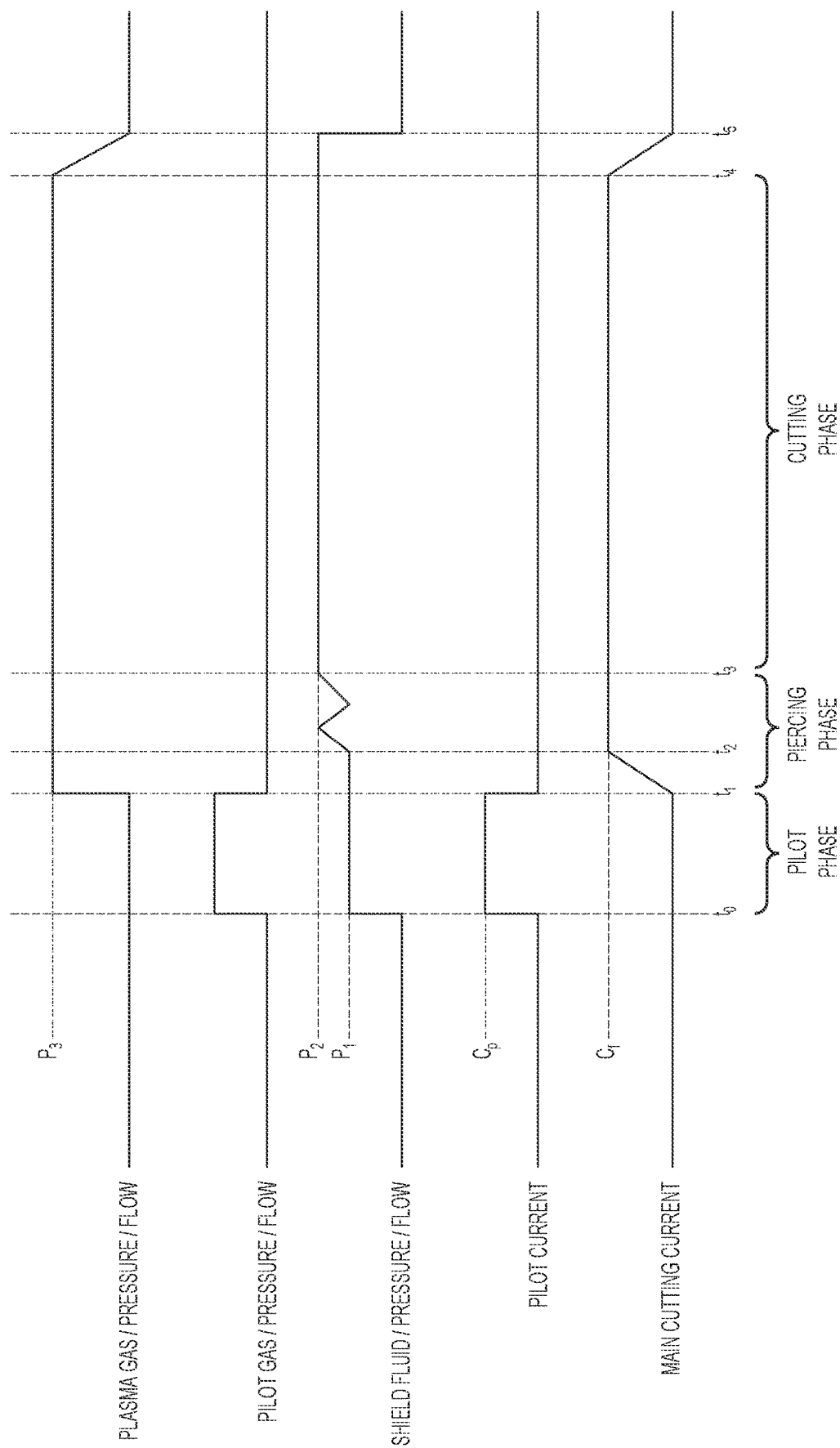

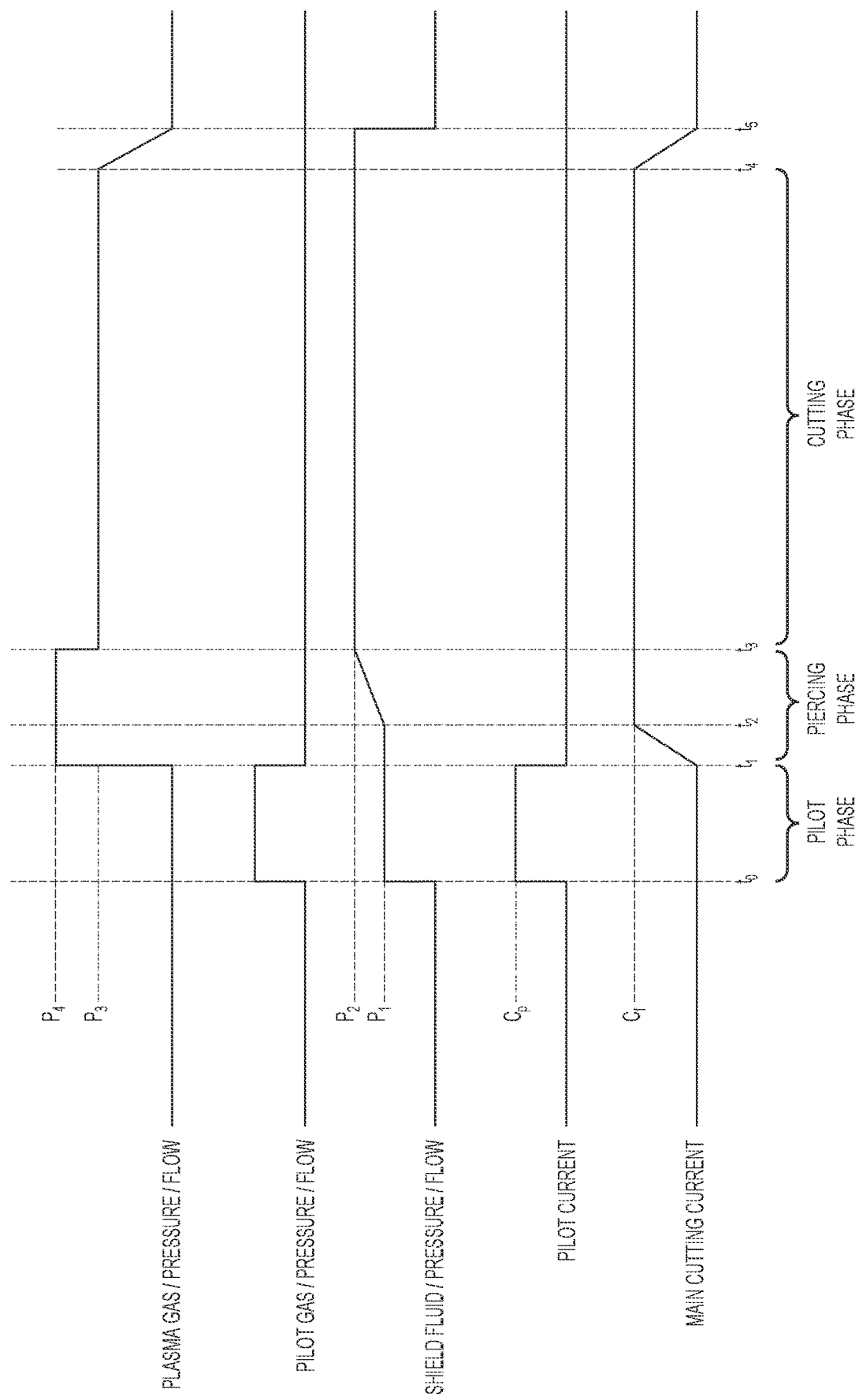

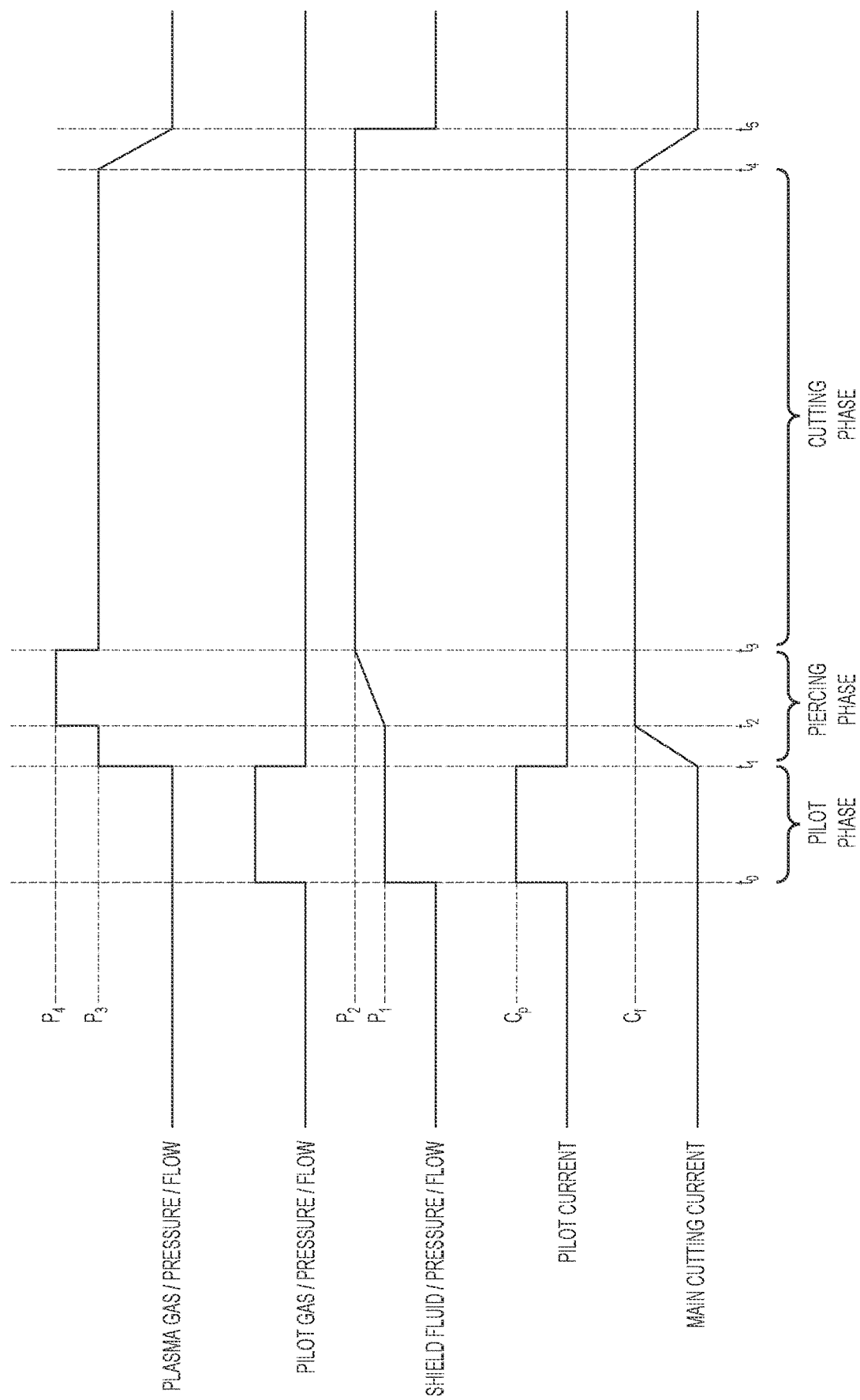

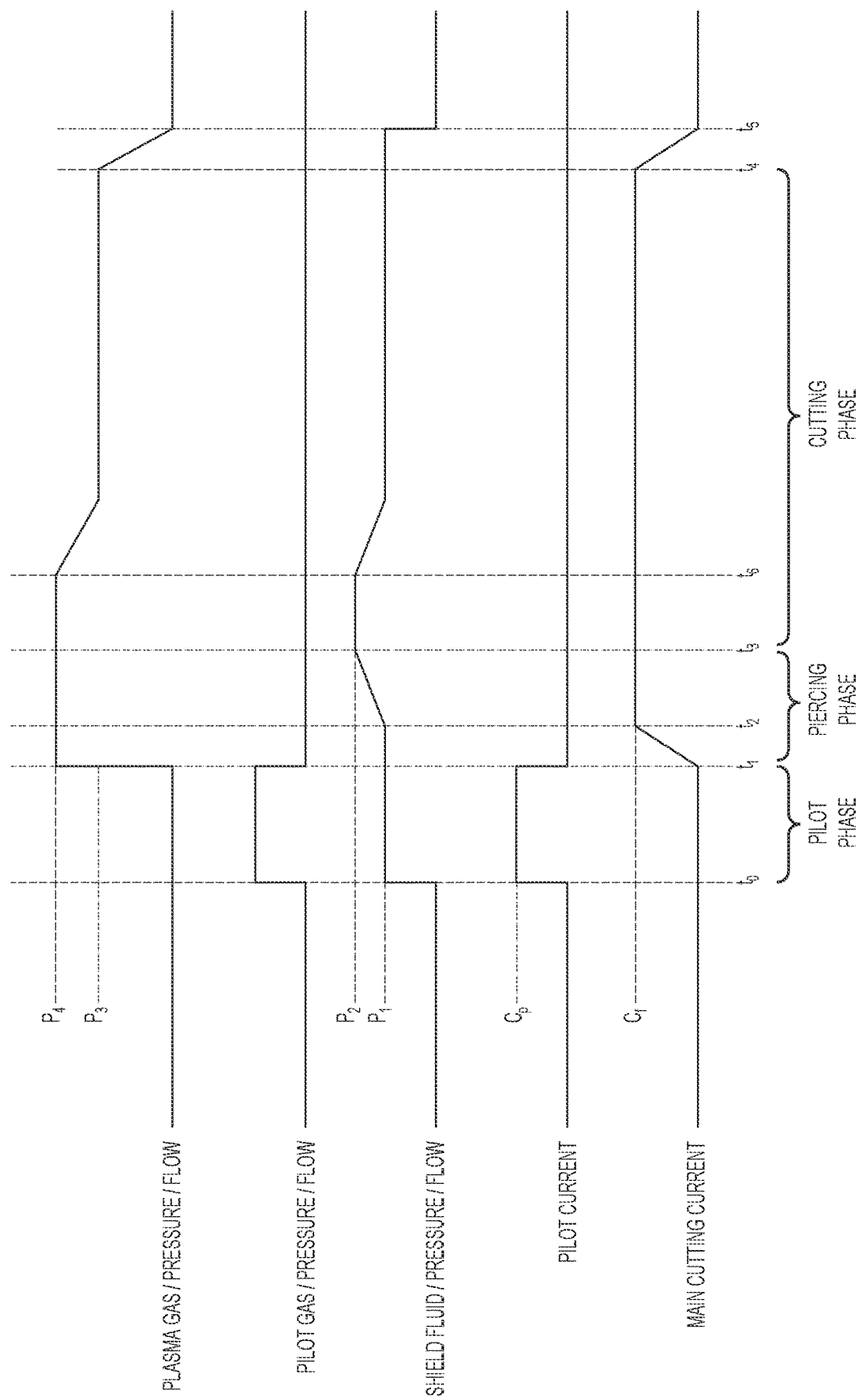

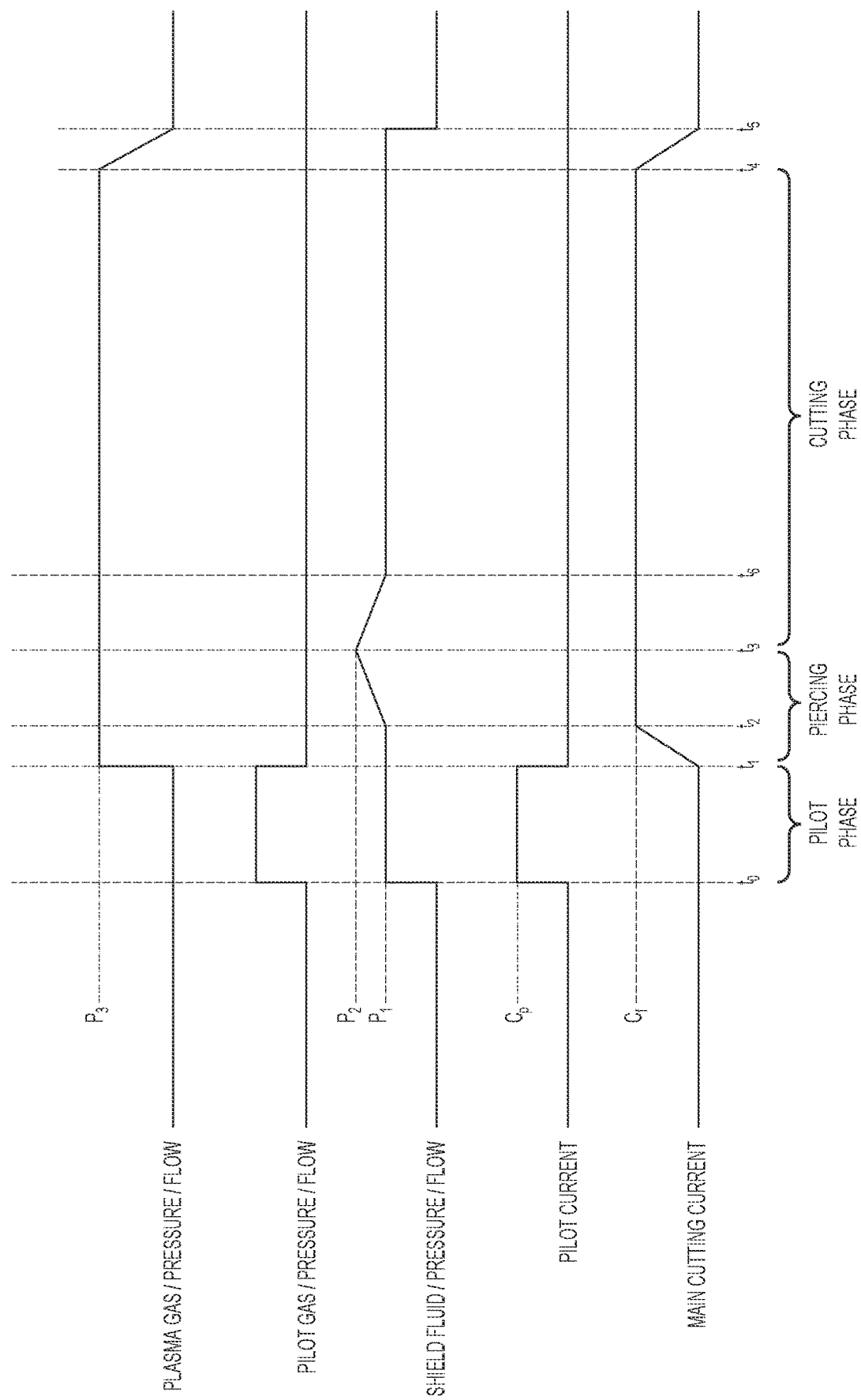

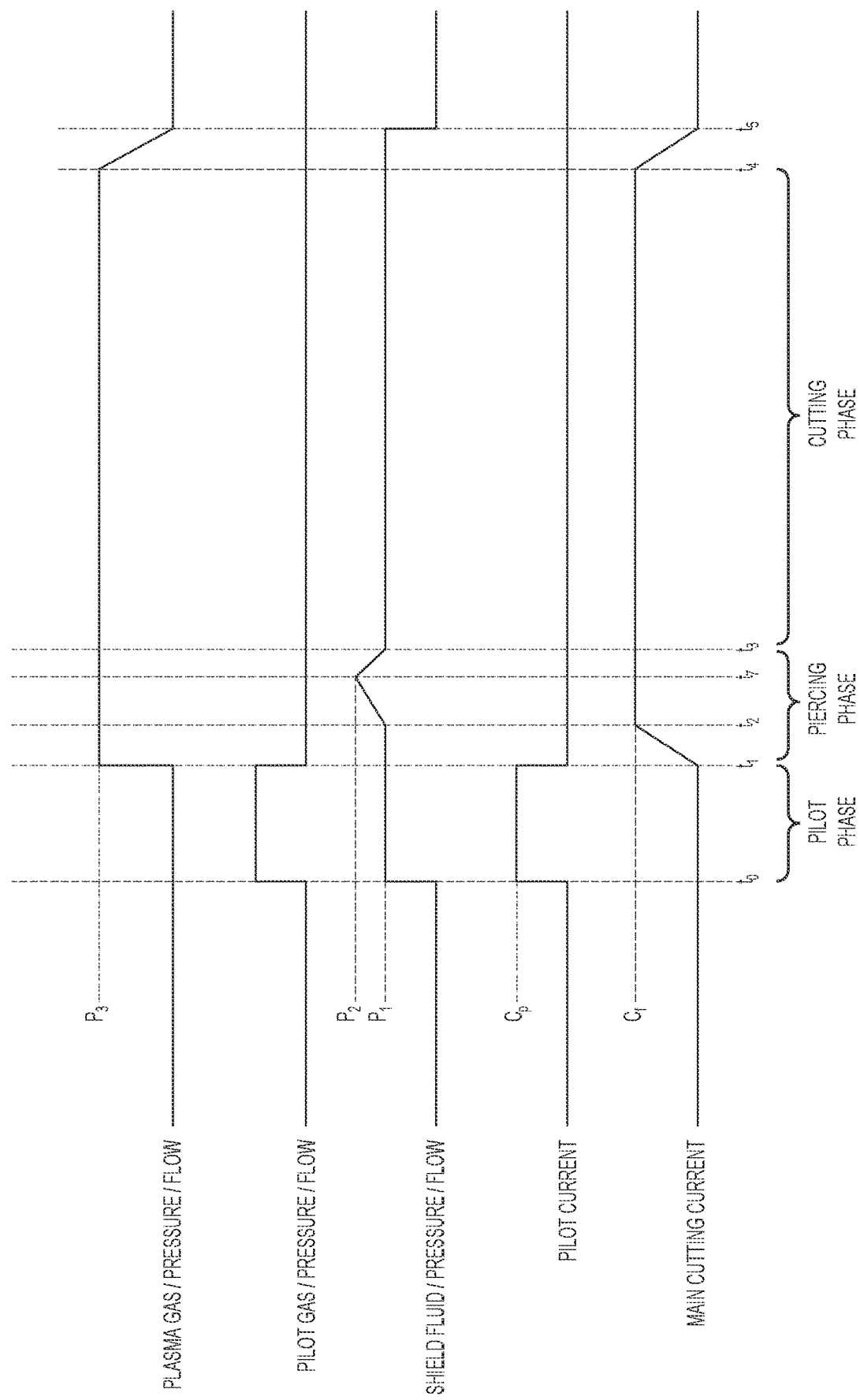

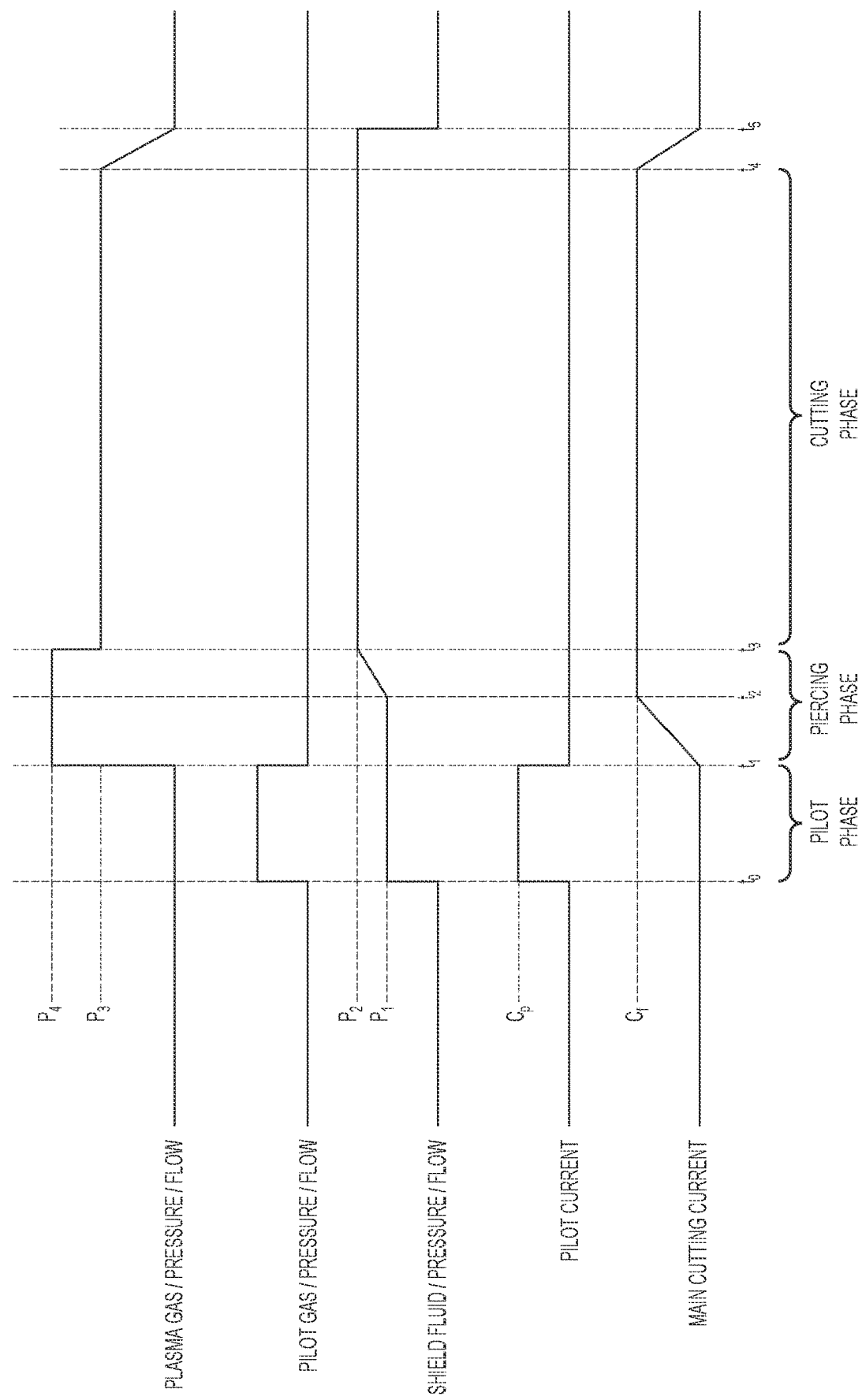

METHODS FOR OPERATING A PLASMA TORCH

TECHNICAL FIELD

The present disclosure relates to methods for operating a plasma torch while piercing and cutting a workpiece.

BACKGROUND

Cutting workpieces of various thicknesses often requires a pierce hole to be formed in the workpiece prior to a cutting of the workpiece along a designated path to produce a desired work product. A need remains in the art to provide methods of operating a plasma torch that guard against arc extinguishment during the formation of pierce holes, provide an effective transition between piercing and cutting operations without compromising the useful life of the torch consumables or otherwise compromising automation operations, and/or to minimize the production of scrap material.

SUMMARY

Techniques for piercing and cutting a metal workpiece are disclosed. These techniques may be embodied as one or more methods, an apparatus, a system, and/or non-transitory computer readable storage media.

In accordance with at least one embodiment, the present application is directed to a method for piercing and cutting a workpiece using a plasma torch that includes an electrode, a nozzle, and a shield. The nozzle is spaced from and surrounds a distal end portion of the electrode to form a plasma gas flow channel while the shield is spaced from and surrounds a distal end portion of the nozzle to form a shield flow channel. The method includes delivering a plasma gas through the plasma gas flow channel while ionizing the plasma gas to produce a plasma arc that extends between the electrode and the workpiece. Additionally, a shield fluid is delivered through the shield flow channel at a first pressure. Then, a piercing operation is initiated to produce a pierce hole in the workpiece using the plasma arc while the shield fluid is delivered through the shield flow channel at the first pressure. After conducting the piercing operation for an amount of time, the shield fluid is delivered to the shield flow channel at a second pressure that is higher than the first pressure. Subsequent to the piercing operation, a cutting operation is performed to form a cut in the workpiece that originates at and extends away from a boundary of the pierce hole.

Among other advantages, increasing the pressure of the shield fluid during piercing may increase the pressure as slag starts to seep or eject from the pierce hole. That is, increasing the pressure of the shield fluid during piercing may increase the shield fluid pressure as slag begins to form. Thus, increasing the shield fluid pressure may push at least some slag into or away from the pierce hole, minimizing, or at least reducing, the amount and/or the height of slag that is present atop the workpiece. Importantly, if too much slag accumulates on top of the workpiece, it can damage the torch (e.g., block a nozzle orifice) and/or prevent automated operations from detecting a stand-off of the torch (a distance between a bottom of the torch and a top of the workpiece). For example, often, a torch will contact the workpiece to zero out a stand-off measurement, but if a significant amount of slag has accumulated on the workpiece, this zeroing will be incorrect (and could damage the torch). Additionally, reducing the amount of slag that forms on top of the workpiece may reduce the length of lead-ins needed to transition a torch between piercing and cutting operations because the torch will not need to maneuver through or around large slag puddles to create cuts without slag imperfections. This may also reduce the amount of scrap metal produced by the plasma torch.

In some of these embodiments, the first pressure is 10% to 50% lower than the second pressure. Moreover, in some embodiments, the first pressure linearly transitions to the second pressure. Alternatively, the first pressure can non-linearly transition to the second pressure, such as via a step, a smooth transition (e.g., an exponential transition), or via any non-uniform transition (e.g., via spikes, waves, and/or steps that increase and decrease while generally moving to an increased pressure). That is, in some instances, the magnitude of the shield pressure variations remains constant during the piercing operation, while according to other implementations the magnitude of the pressure variations change over time. Different transition profiles may be tailored to different piercing schemes, for example, if a torch position moves (in any degree of freedom) during a pierce and each transition profile may provide its own advantages. As a specific example, progressively increasing the shield fluid pressure during a pierce may progressively increase the shield fluid pressure as the depth of the pierce increases and, presumably, as more molten material is generated so that slag prevention/reduction remains relatively constant over an entire pierce.

In some embodiments, the techniques described herein maintain the shield fluid at the second pressure during at least a portion of the cutting operation. When coupled with the shield fluid pressure increase during piercing, maintaining the shield fluid at the second pressure during cutting may reduce and/or minimize slag across a workpiece that is cut and pierced. More specifically, as mentioned, increasing the shield fluid pressure may push slag into or away from the pierce hole, minimizing, or at least reducing, the amount and/or height of slag that is present atop the workpiece during a pierce. Then, maintaining the shield fluid pressure at the increased pressure may ensure that slag continues to be pushed into and/or through the workpiece during a cut that extends away from the pierce.

Still further, in some embodiments, the techniques described herein deliver the plasma gas through the plasma gas flow channel at a third pressure during the piercing operation and deliver the plasma gas through the plasma gas flow channel at a fourth pressure that is lower than the third pressure during the cutting operation. In at least some of these instances, the plasma gas is also ramped up in pressure from a pressure below the third pressure to the third pressure. The ramping from and/or to the third pressure can be before or during the piercing operation. For example, the plasma gas may be ramped up in pressure prior to delivery of the shield fluid to the shield flow channel at the second pressure. Alternatively, the plasma gas ramping may start in time synchronization with a ramping of the shield fluid from the first pressure to the second pressure, but in a manner that still causes the shield fluid pressure ramping to lag behind the plasma gas ramping. In any case, the plasma gas may be ramped up in pressure in a linear or non-linear manner.

Thus, this application may realize the advantages discussed herein (e.g., slag removal advantages) in combination with advantages discussed in U.S. application Ser. No. 16/731,455, entitled "Methods for operating a plasma torch," the disclosure of which is incorporated herein by reference in its entirety. For example, the techniques presented herein may provide slag removal/prevention advantages for piercing techniques that realize an increase in power of momentum of the arc by using an elevated plasma gas pressure during piercing. In fact, the techniques presented in the present application may be particularly suited for piercing operations that utilize an elevated plasma gas pressure because such piercing operations may cause a greater amount of molten metal to be expelled from a pierce during the formation of the pierce hole (e.g., as a result of the higher striking force of the arc).

In accordance with another embodiment, the techniques described herein relate to a method for piercing and cutting a workpiece using a plasma torch that includes an electrode, a nozzle, and a shield. The nozzle is spaced from and surrounds a distal end portion of the electrode to form a plasma gas flow channel while the shield is spaced from and surrounds a distal end portion of the nozzle to form a shield flow channel. The method includes, during at least a first time and a second time that succeeds (i.e., comes after) the first time, delivering a plasma gas through the plasma gas flow channel and ionizing the plasma gas to produce a pilot arc. At the first time, a shield fluid is delivered through the shield flow channel at a first pressure. During at least a portion of the second time, the shield fluid is delivered through the shield flow channel at a second pressure that is greater than the first pressure. Subsequent to the piercing operation, a cutting operation is performed that forms a cut in the workpiece that originates at and extends away from a boundary of the pierce hole. During the cutting operation, the shield fluid is delivered through the shield flow channel at a shield cutting pressure that is substantially equal to or greater than the second pressure.

At least because the shield fluid is delivered to the shield flow channel at a shield cutting pressure that is substantially equal to or greater than the second pressure during a cutting operation, the method may reduce and/or minimize slag across a workpiece that is cut and pierced. Thus, this method may realize the advantages discussed above in connection with slag minimization. Moreover, this method may execute or include any of the operations or features discussed above and may realize the advantages associated therewith.

Moreover, in some embodiments, the piercing operation extends across the second time and a third time, and the method further includes delivering, during the third time, the shield fluid through the shield flow channel at a third pressure that is different from the first pressure, the second pressure, or both the first pressure and the second pressure. In some instances, the second time precedes the third time and the third pressure is greater than the second pressure. Alternatively, the second time can precede the third time and the third pressure can be lower than the second pressure. Additionally, in some embodiments, the piercing operation extends across the second time, the third time, and a fourth time, and the shield fluid is delivered through the shield flow channel at a fourth pressure during the fourth time. The fourth pressure may be different from the first pressure, the second pressure, the third pressure, or any combination of the first pressure, the second pressure, and the third pressure. Still further, in some instances, the shield fluid is delivered to the shield flow channel at the first pressure and the second pressure in an alternating manner. Thus, different shield fluid schemes may be achieved and tailored to different piercing schemes, for example, if a torch position moves (in any degree of freedom) during a pierce. Each scheme may provide its own advantages and/or be best suited to different plasma pressure and/or current schemes.

Still further, in some embodiments, the shield fluid is delivered through the shield flow channel at the second pressure during substantially all of the second time. For example, the shield fluid might be ramped at an initiation of piercing and maintained at a ramped level during the piercing operation and the cutting operation. Additionally or alternatively, each of the first pressure and the second pressure may be lower than the shield cutting pressure. Alternatively, the second pressure may be substantially equal to the shield cutting pressure.

These and other advantages and features will become evident in view of the drawings and detailed description.

BRIEF DESCRIPTION OF THE DRAWINGS

To complete the description and in order to provide for a better understanding, a set of drawings is provided. The drawings form an integral part of the description and illustrate embodiments of the present application, which should not be interpreted as restricting the scope of the invention, but just as examples of how the invention can be carried out. The drawings comprise the following figures:

FIG. 2 is a graph showing variations in plasma torch operating parameters over time according to the present state of the art.

FIG. 3 is a graph showing variations in plasma torch operating parameters over time where shield fluid pressure is elevated during a piercing operation in a linear manner and maintained at an elevated pressure during a cutting operation.

FIG. 3A is a graph showing variations in plasma torch operating parameters over time where shield fluid pressure is elevated during piercing and cutting operations.

FIGS. 4-6 are graphs illustrating variations of FIG. 3 where the shield fluid pressure is elevated during a piercing operation in non-linear manners.

FIGS. 7 and 8 are graphs illustrating variations of FIG. 3 where the shield fluid pressure is elevated during a piercing operation in a linear manner and the plasma gas pressure is elevated before and during the piercing operation, respectively.

FIGS. 9-11 are graphs illustrating variations of FIG. 3 where the shield fluid pressure is elevated during a piercing operation in a linear manner and decreased to a non-elevated pressure after the end of a piercing operation, at the end of a piercing operation, and before the end of a piercing operation, respectively.

FIG. 12 is a graph illustrating a variation of FIG. 3 where the main cutting current ramp up time is extended to occur over a longer time period.

Like reference numerals have been used to identify like elements throughout this disclosure.

DETAILED DESCRIPTION

The following description is not to be taken in a limiting sense but is given solely for the purpose of describing the broad principles of the present application. Embodiments of the present application will be described by way of example, with reference to the above-mentioned drawings showing elements and results of such embodiments.

Generally, with the techniques presented herein, the shield fluid pressure is ramped up during a piercing operation. To be clear, the shield pressure is not ramped up prior to a piercing operation and maintained at an elevated level; instead, the shield fluid pressure increases/elevates during the piercing operation. That is, the shield fluid ramping lags behind the initiation of a pierce and/or behind a ramping of the plasma gas during a pierce. The lagged shield fluid ramping pushes slag into a pierce hole after some slag is generated in the initial stages of a pierce. Additionally or alternatively, the lagged shield fluid ramping can push slag away from a pierce hole.

Either way, the lagged ramping at least discourages slag from accumulating on top of a workpiece and/or reduces a height of such slag. This is beneficial because if too much slag accumulates atop a workpiece (e.g., slag extends too high), the slag can contact and damage the torch (e.g., block a nozzle orifice) and/or negatively impact automated operations. For example, when slag accumulates atop a workpiece, an automated system may be unable to detect a stand-off of the torch (a distance between a bottom of the torch and a top of the workpiece) because the slag may prevent the torch from contacting the top of the workpiece. Alternatively, even if an automated system could compensate for the slag in a stand-off calculation, contacting slag can damage the torch. Moreover, reducing the amount of slag that forms on top of the workpiece may reduce the length of lead-ins needed to transition a torch between piercing and cutting operations thereby reducing the amount of scrap metal produced by the plasma torch.

Figure 1A:
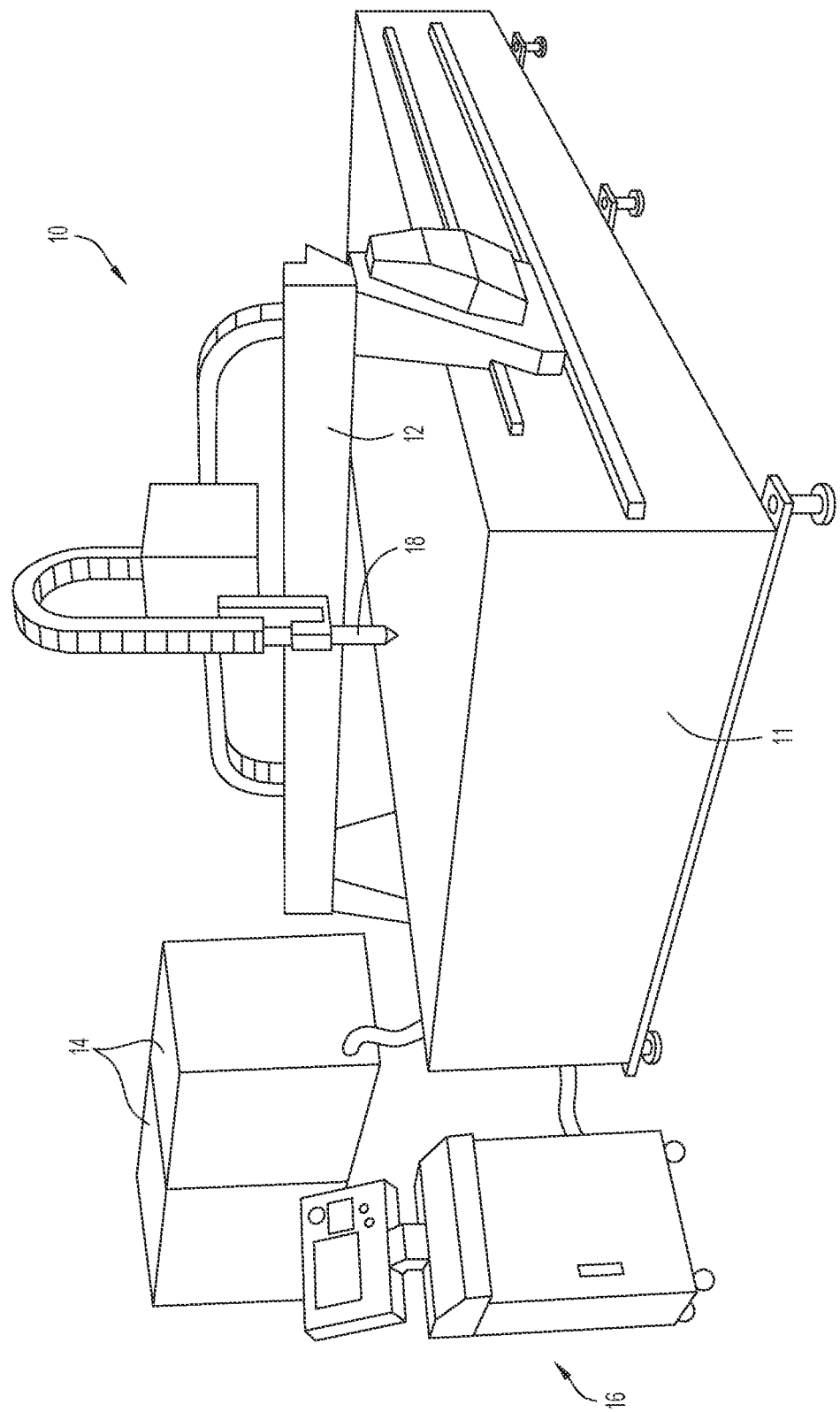
FIG. 1A is a perspective view of an automated cutting system that may execute the techniques presented herein, according to an example embodiment of the present disclosure.

FIG. 1A illustrates an example embodiment of an automated cutting system 10 that may execute the techniques presented herein. However, this automated cutting system 10 is merely presented by way of example and the techniques presented herein may also be executed by manual cutting systems and/or automated cutting systems that differ from the automated cutting system 10 of FIG. 1A (e.g., any robotic or partially robotic cutting system). That is, the cutting system 10 illustrated in FIG. 1A is provided for illustrative purposes.

At a high-level, the cutting system 10 includes a table 11 configured to receive a workpiece (not shown), such as, but not limited to, sheets of metal. The automated cutting system also includes a positioning system 12 that is mounted to the table 11 and configured to translate or move along the table 11. At least one automated plasma arc torch 18 is mounted to the positioning system 12 and, in some embodiments, multiple automated plasma arc torches 18 may be mounted to the positioning system 12. The positioning system 12 may be configured to move, translate, and/or rotate the torch 18 in any direction (e.g., to provide movement in all degrees of freedom).

Additionally, at least one power supply 14 is operatively connected to the automated plasma arc torch 18 and configured to supply (or at least control the supply of) electrical power and flows of one or more fluids to the automated plasma arc torch 18 for operation. Finally, a controller or control panel 16 is operatively coupled to and in communication with the automated plasma arc torch 18, the one or more power supplies 14, and the positioning system 12. The controller 16 may be configured to control the operations of the automated plasma arc torch 18, one or more power supplies 14, and/or the positioning system 12, either alone or in combination with the one or more power supplies 14.

In at least some embodiments, the one or more power supplies 14 meter one or more flows of fluid received from one or more fluid supplies before or as the one or more power supplies 14 supply gas to the torch 18 via one or more cable conduits. Additionally or alternatively, the automated cutting system 10 may include a separate fluid supply unit (not shown) or units that can provide one or more fluids to the automated torch 18 independent of the one or more power supplies 14. To be clear, as used herein, the term "fluid" shall be construed to include a gas or a liquid. The one or more power supplies 14 may also condition, meter, and supply power to the automated torch 18 via one or more cables, which may be integrated with, bundled with, or provided separately from cable conduits for fluid flows. Additional cables for data, signals, and the like may also interconnect the controller 16, the automated plasma arc torch 18, the power supply 14, and/or the positioning system 12. Any cable or cable conduit/hose included in the automated cutting system 10 may be any length. Moreover, each end of any cable or cable conduit/hose may be connected to components of the automated cutting system 10 via any connectors now known or developed hereafter (e.g., via releasable connectors).

Figure 1B:
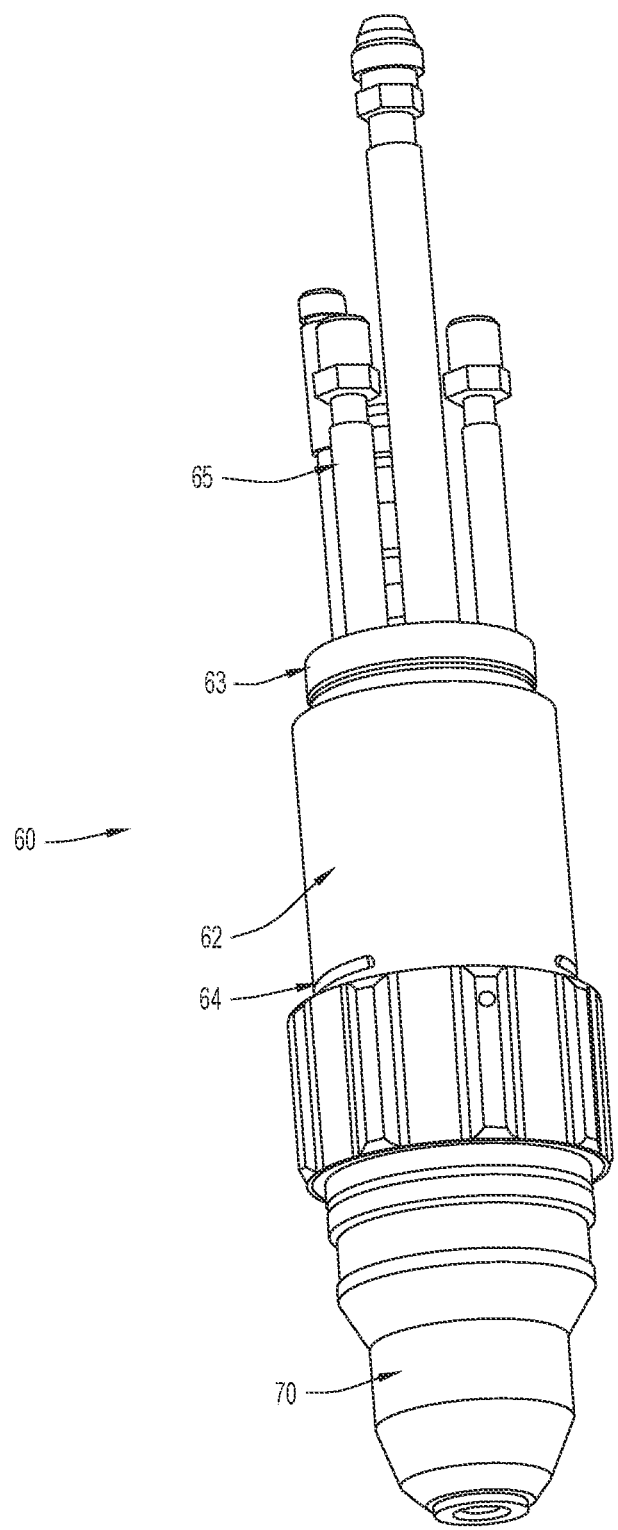
FIG. 1B is perspective view of an automated cutting head that may be included in the automated cutting system illustrated in FIG. 1A, according to an example embodiment of the present disclosure.

FIG. 1B illustrates an example embodiment of an automated cutting head 60 that may be used with an automated cutting system executing the techniques presented herein (e.g., the cutting system 10 of FIG. 1A). As can be seen, the cutting head 60 includes a body 62 that extends from a first end 63 (e.g., a connection end 63) to a second end 64 (e.g., an operating or operative end 64). The connection end 63 of the body 62 may be coupled (in any manner now known or developed hereafter) to an automation support structure (e.g., a cutting table, robot, gantry, etc., such as positioning system 12). Meanwhile, conduits 65 extending from the connection end 63 of the body 62 may be coupled to like conduits in the automation support structure (e.g., positioning system 12) to connect the automated cutting head 60 to a power supply, one or more fluid supplies, a coolant supply, and/or any other components supporting automated cutting operations.

At the other end, the operative end 64 of the body 62 may receive interchangeable components, including consumable components 70 that facilitate cutting operations. For simplicity, FIGS. 1A and 1B do not illustrate connections portions of the body 62 that allow consumable components 70 to connect to the torch body 62 in detail. However, it should be understood that the cutting consumables, such as those schematically illustrated in FIG. 1C, may be coupled to a torch body 62 in any manner. Moreover, to be clear, the consumable stack 70 depicted in FIGS. 1B and 1C (with an external perspective view and a schematic cross-sectional illustration, respectively) is merely representative of a consumable stack that may be used with an automated torch executing the techniques presented herein. Similarly, while none of the Figures of the present application illustrate an interior of torch body 62, it is to be understood that any unillustrated components that are typically included in a torch, such as components that facilitate cutting operations, may (and, in fact, should) be included in a torch executing example embodiments of the present application.

Figure 1C:
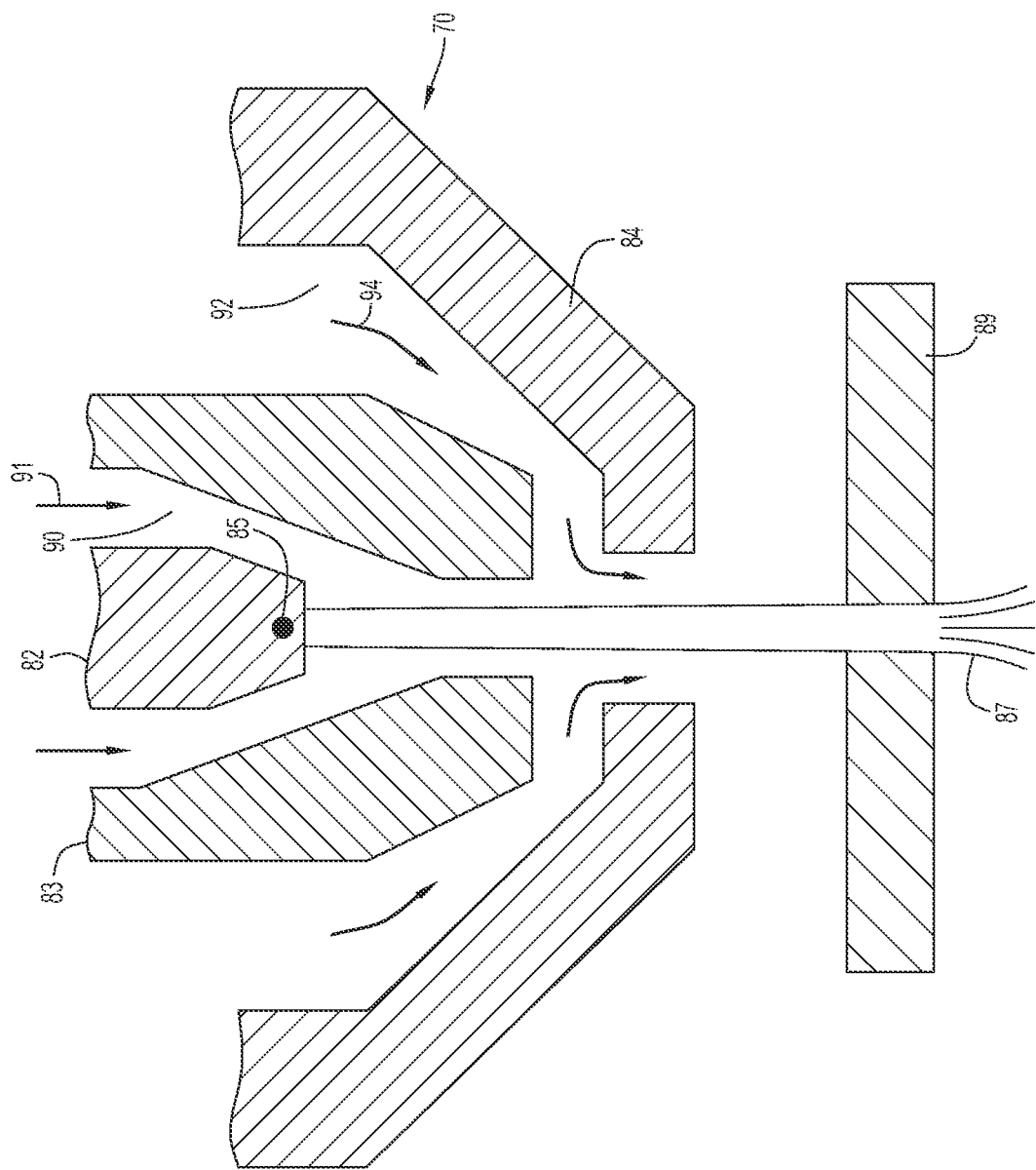
FIG. 1C is a schematic, cross-sectional view of an end portion of a plasma torch.

Now turning to FIG. 1C, this Figure is a simplified/schematic illustration of the consumable stack 70 of FIG. 1B. As mentioned, FIG. 1C only illustrates select components or parts that allow for a clear and concise illustration of the techniques presented herein. Thus, in FIG. 1C, only an electrode 82, a nozzle 83, and a shield cap 84 of the consumable stack 70 are depicted. As can be seen, the electrode 82 is disposed at a center of the consumable stack 70 and includes an emitter 85 (e.g., formed from hafnium, tungsten, and/or other emissive materials) at a distal end portion thereof. The torch nozzle 83 is generally positioned around the electrode 82. In some embodiments, the nozzle 83 is installed after the electrode 82. Alternatively, the electrode 82 and nozzle 83 can be installed onto the torch body as a single component (e.g., these components may be coupled to each other to form a cartridge and installed on/in the torch body as a cartridge). In either case, the nozzle 83 may be spaced from the electrode 82; or, at least a distal portion of the nozzle 83 may be spaced apart from the distal portion of the electrode 82.

The shield 84 is positioned radially exteriorly of the nozzle 83 and is spaced apart from the nozzle, at least at its distal end. In some embodiments, the shield 84 is installed around an installation flange of the nozzle 83 in order to secure nozzle 83 and electrode 82 in place at (and in axial alignment with) an operating end of the torch body. Additionally or alternatively, the nozzle 83 and/or electrode 82 can be secured or affixed to a torch body in any desirable manner, such as by mating threaded sections included on the torch body with corresponding threads included on the components. For example, in some implementations, the electrode 82, nozzle 83, shield 84, as well as any other components (e.g., a lock ring, spacer, secondary cap, etc.) may be assembled together in a cartridge that may be selectively coupled to the torch body, e.g. by coupling the various components to a cartridge body or by coupling the various components to each other to form a cartridge.

In use, a plasma torch is configured to emit a plasma arc 87 between the electrode 82 and a workpiece 89 to which a work lead associated with a power supply is attached (not shown). As shown in FIG. 1C, the nozzle 83 is spaced a distance away from the electrode 82 so that a plasma gas flow channel 90 is disposed therebetween. During piercing and cutting operations, a plasma gas 91 flows through the plasma gas flow channel 90. The shield 84 is also spaced a distance away from the nozzle 83 so that a shield flow channel 92 is disposed between the shield 84 and the nozzle 83, A shield fluid 94 flows through the shield flow channel 92 during at least a portion of the time the torch is operated.

Now turning to FIG. 2, but in combination with FIG. 1C, FIG. 2 depicts a timeline showing how pilot current, main cutting current, pilot gas, plasma gas and shield fluid are supplied to a plasma torch during a plasma torch cutting operation according to the current state of the art. In this embodiment, during initiation at time $t_0$, a high voltage and high frequency signal is applied as pilot current Cp (e.g., approximately 10 to approximately 50 Amps) between the electrode 82 and the nozzle 83. This produces an arc between the electrode 82 and the nozzle 83 that extends across the plasma gas flow passage 90 through which pilot gas 91 is supplied. As pilot gas 91 flows through channel 90 during arc initiation (i.e., during the pilot phase) it is ionized to form an electrically conductive plasma arc 87 that is then directed out the nozzle 83 toward the electrically conductive workpiece 89 (e.g. metal workpiece). During the pilot phase, a shield fluid 94 also flows through the shield flow channel 92 to protect the pilot arc from contaminants. That is, in the state of the art piercing and cutting scheme depicted in FIG. 2, a shield fluid 94 is caused to flow through the shield flow channel 92 at a pressure P1 beginning at time $t_0$.

When the plasma arc transfers to the workpiece 89 at time $t_1$, the torch transitions from a pilot phase to a piercing phase. Thus, at time $t_1$, main cutting current is supplied to the electrode 82 and ramped up so that it reaches a full cutting current $C_f$ at time $t_2$, shortly after initiation of the piercing phase at time $t_1$. According to some implementations, the switching from pilot current $C_p$ to full main cutting current $C_f$ commences upon the power supply detecting a change in power characteristics (e.g., current or voltage) when the plasma arc 87 is transferred to the workpiece 89. In any case, during the switching, the power supply disconnects from the nozzle 83 and the main cutting current is ramped up to full cutting current $C_f$. Once the current is ramped to the full cutting current $C_f$, it remains at the full cutting current $C_f$ until the piercing phase is completed at time $t_3$. In some implementations, the full cutting current $C_f$ is approximately 150 Amps, but in other embodiments, the full cutting current $C_f$ is less than approximately 150 Amps, between approximately 150 Amps and 500 Amps, or more, such as in the range of approximately 600 to approximately 800 Amps, approximately 900 Amps (e.g., 890 Amps), or more.

Additionally, when the torch transitions form the pilot phase to the piercing phase, plasma gas and shield fluid are provided to the torch. The plasma gas 91 is provided through the plasma gas flow channel 90 to transfer a pilot arc from the nozzle 83 to the workpiece 89. In the depicted state of the art scheme, the plasma gas 91 is provided a constant pressure P3 throughout the piercing phase and the cutting phase. During the piercing phase, this plasma gas 91 is ionized so that the plasma arc 87 extends to the workpiece 89 to establish a closed electrical circuit including the electrode 82 and the workpiece that is sufficient to cut through the workpiece 89 by a localized melting of the material from which the workpiece 89 is made. Notably, although FIG. 2 shows the pilot gas switching off at time $t_1$ as the supply of plasma gas is initiated, in many implementations, the pilot gas and the plasma gas are the same. In such instances, the switching from pilot gas to plasma gas may only involve changing the gas pressure.

Meanwhile, with the state of the art piercing and cutting scheme depicted in FIG. 2, a shield fluid 94 that was flowing through the shield flow channel 92 during the pilot phase continues to flow through the shield flow channel 92 during the piercing phase (e.g., from time $t_1$ to time $t_3$), at the same, constant pressure P1. The piercing phase ends (at time $t_3$) when the workpiece 89 has been fully penetrated by the plasma stream 87.

In the depicted scheme, the plasma gas 91 is supplied at pressure P3 for the piercing phase (e.g., from time $t_1$ to time $t_3$) and a subsequent cutting phase (e.g., from time $t_3$ to time $t_4$). Likewise, the shield fluid 94 is supplied at pressure P1 for the piercing phase (e.g., from time $t_1$ to time $t_3$) and a subsequent cutting phase (e.g., from time $t_3$ to time $t_4$). Thus, each of the plasma gas pressure and shield fluid pressure remains constant during the piercing phase between time $t_1$-$t_3$ (when a pierce hole is formed through the workpiece) and a cutting phase between time $t_3$-$t_4$ (when the workpiece is cut to form a desired work product). According to one standard operating procedure, the pressure of the plasma gas 91 is maintained at around 60 psi and the pressure of the shield fluid 94 is maintained at about 80 psi during the piercing and cutting phases. Then, after termination of the cutting phase at time $t_4$, the pressure of the plasma gas 91 and the pressure of the shield fluid 94 are ramped down to or near 0 psi at time $t_4$-$t_5$. During this ramp down period (e.g., from time $t_4$-$t_5$), the cutting current is also ramped down to 0 amps.

FIG. 3 is a graph showing variations in plasma torch operating parameters over time as compared to FIG. 2. In this embodiment, shield fluid pressure is elevated during a piercing operation in a linear manner and maintained at an elevated pressure during a cutting operation. More specifically, in the implementation of FIG. 3, the shield fluid pressure is initially stepped up to an elevated pressure P1 at the commencement of the piercing phase at time $t_1$, and then is further elevated during the piercing phase at time $t_2$, progressively increasing to a second pressure P2 until the end of the piercing phase at time $t_3$. According to some implementations pressure P2 is 10% to 50% greater than pressure P1. Alternatively, from another perspective, the first pressure P1 may be 10% to 50% lower than the second pressure P2. As an example in at least one implementation, first pressure P1 may be 10-35 psi and the second pressure P2 may be 40-90 psi.

Moreover, in different embodiments, time $t_2$ may lag different amounts of time behind time $t_1$ and, thus, may create different ratios of lower shield fluid pressure time to higher shield pressure time (e.g., different rations of $t_1$-$t_2$: $t_2$-$t_3$). In some instances, the ratio of $t_1$-$t_2$: $t_2$-$t_3$ may be 50:50, but in other embodiments, the ratio may be 40:60, 60:40, 70:30, 30:70, or any other ratio, for example, with a range of 10:90 to 90:10. Moreover, in some embodiments, time span $t_1$-$t_2$ and time span $t_2$-$t_3$ may each comprise one or more seconds, but in other embodiments, one or both time spans may be less than a second. As an example, according to in at least one implementation, time span $t_1$-$t_2$ is approximately 0.1 seconds and time span $t_2$-$t_3$ is approximately 10 seconds. However, to be clear, this lag time (e.g., time span $t_1$-$t_2$) need not be created with computer programming alone and can, for example, be a consequence of valve opening time, lead length, and/or other mechanical arrangements, with or without a lag in the control of the pressure.

Regardless of the ratio, the shield fluid ramping from pressure P1 to pressure P2 lags behind or "succeeds" an initiation of the piercing phase. That is, the shield fluid pressure starts to increase from pressure P1 at a time $t_2$ that is at least some time after initiation of the piercing phase at time $t_1$. As mentioned, when the shield fluid ramping lags behind the initiation of a pierce, the lagged shield fluid ramping pushes slag into a pierce hole after some slag is generated in the initial stages of a pierce. This at least discourages, slag from accumulating on top of a workpiece, which can damage the torch (e.g., block a nozzle orifice) and/or negatively impact automated operations. Additionally or alternatively, the lagged ramping, may serve to move or spread slag away from the pierce hole. That is, if slag is already present when the shield fluid pressure is ramped up, the some slag may be pushed away from the pierce hole, which may reduce the maximum height of any slag disposed around the pierce hole. Without this height reduction, the slag may form a pile that comes into contact and damages or destroys plasma cutting consumables.

Still referring to FIG. 3, but now in combination with FIG. 3A, in these two embodiments, the shield fluid pressure plateaus at pressure P2 during the piercing phase and is maintained at pressure P2 for the duration of the cutting phase. This may ensure that the cutting operations continue to prevent, or at least discourage, slag formation atop the workpiece, which might damage a component being created during a cutting operation. Alternatively, even if the slag does not cause damage, slag prevention/minimization may improve manufacturing efficiency since the slag will not need to be removed from a cut component with additional machining operations (e.g., milling).

Maintaining the shield fluid at an elevated pressure during the cutting phase may be particularly important when cutting at high currents, such as currents above approximately 300 Amps, above approximately 400 Amps, or above approximately 600 Amps, where risk of splatter and slag formation becomes heightened (since the arc becomes more powerful). However, the embodiments shown in FIGS. 3 and 3A are merely examples and the shield fluid pressure need not be maintained at pressure P2 for the entirety of the cutting phase. Alternatively, the shield fluid pressure may not be maintained at pressure P2 for the entirety of the cutting phase with or without the specific plasma gas pressure scheme illustrated in FIG. 3. On the other hand, the shield fluid pressure need not be maintained at an increase pressure P2 after ramping the shield pressure subsequent to initiation of the pierce. For example, as is illustrated by FIG. 3A, the shield fluid pressure might be elevated at the initiation of a piercing phase (e.g., at time $t_0$) and maintained at this elevated pressure throughout the piercing and cutting phases. Alternatively, the shield fluid pressure might be elevated for any portion of a piercing phase.

Generally, in the processes disclosed herein each of the plasma gas and shield fluid may be for example, compressed air, oxygen, nitrogen, $H_{35}$ (35% hydrogen/65% argon). The shield fluid may also be a $H_2O$ mist or water. The plasma and shield fluids used in a particular situation are largely dependent on the composition and thickness of the workpiece being cut.

Now turning to FIGS. 4-6, in different embodiments, the shield fluid pressure may be increased in accordance with different profiles or manners. In fact, for the purposes of this application, the ramping profile of the shield fluid pressure illustrated in FIG. 3 between time $t_2$ and time $t_3$ may be referred to as a linear ramping because it ramps along a single, straight line, from a first pressure P1 to a second, higher pressure P2. By comparison, all of the ramping profiles shown in FIGS. 4-6 may be referred to as non-linear profiles or manners, even if these profiles/manner include linear components. First, FIG. 4 illustrates an exponential ramping of the shield fluid between time $t_2$ and time $t_3$, where the magnitude of the pressure variations increases over time. Second, FIG. 5 illustrates a stepped ramping of shield fluid pressure where the shield fluid pressure jumps to a second pressure P2 at time $t_2$ and remains at pressure P2 until (and subsequent $t_0$) time $t_3$. Third, FIG. 6 illustrates a spike ramping, where the shield fluid pressure ramps up to pressure P2 at time $t_2$ and then oscillates between the second pressure P2 and the first pressure P1 for the remainder of the between time $t_2$ and time $t_3$.

To be clear, FIGS. 4-6 depict alternate embodiments of FIG. 3, but are not intended to be limiting in any way. Instead, each embodiment may be modified in any manner or combined with another embodiment in any manner. For example, a ramping of the shield fluid pressure between time $t_2$ and time $t_3$ may be arcuate in any manner or include any number of flat steps and need not match FIG. 4 or FIG. 5, respectively. Alternatively, a ramping of the shield fluid pressure between time $t_2$ and time $t_3$ may include multiple steps, with identical or varied steps (e.g., with one-step being flat and another step being arcuate or linearly sloped). However, when the pressure of the shield fluid continually increases (at a constant or varied magnitude), this may cause the shield fluid pressure to increase as the depth of a pierce increases. In at least some embodiments, this may be beneficial because more molten material may try to exit a pierce hole as the pierce hole is formed (since more material is removed from a workpiece to increase the depth of the pierce hole). Thus, the increased pressure may be able to produce sufficient pressure that pushes slag back into and/or away from a hole over an entire piercing phase. By comparison, stepped increases in pressure may provide abrupt changes. Such abrupt changes may be beneficial at least when a certain point of a pierce is known to produce a significant amount of slag.

On other hand, in at least some embodiments, such as the embodiment of FIG. 6, the pressure of the shield fluid does not continually increase between time $t_2$ and time $t_3$; instead, the pressure increases and decreases between time $t_2$ and time $t_3$. Such a profile may serve to create pulses or waves of shield fluid, which, in some embodiments, may be advantageous for moving or removing slag that is ejecting or seeping from a partially formed pierce hole during a piercing phase. To be clear, when the pressure of the shield fluid does not continually increase between time $t_2$ and time $t_3$, the pressure need not spike with linear spikes/waves, need not spike (or otherwise vary) in a consistent manner, and need not include any specific number of spikes or waves. Moreover, in some embodiments, the spikes, waves, or other such variations may cumulatively increase to an elevated pressure P2 (i.e., at or near time $t_3$, the pressure may be elevated), but in other embodiments, the spikes, waves, or other such variations need not cumulatively increase.

Now turning to FIGS. 7 and 8, these Figures illustrate variations of the graph of FIG. 3 to illustrate how, in at least some embodiments, the ramping of the shield fluid may be utilized when an elevated pressure is used for the plasma gas during the piercing phase. For simplicity, both FIGS. 7 and 8 depict the shield fluid ramping as a linear ramping. However, this is merely an example and it is to be understood that the concepts of FIGS. 7 and 8 could also be utilized in combination with any of the ramping profiles illustrated in FIGS. 4-6 or variations and/or combinations thereof. Generally, it may be advantageous to use the shield fluid ramping techniques herein when the plasma gas pressure is elevated during the piercing phase. This is because the elevated plasma gas pressure may produce an overall increase in power and momentum of the arc (since the increased plasma gas pressure may increase the voltage in the plasma chamber, thereby producing higher power (P=V*I) and higher plasma enthalpy), which, in turn, may cause the plasma jet stream to strike the workpiece with a greater force. This increased force tends to cause a greater amount of molten metal residing in the pierce to be expelled from the pierce during the formation of the pierce hole (e.g., to make way for the plasma arc as the pierce depth increases). Thus, with an elevated pressure, there may be a greater need to contain molten metal and discourage slag formation, or at least discourage slag from accumulating to large heights (i.e., "tall slag formations").

With that all said, in FIG. 7, the plasma gas pressure ramps to an elevated pressure P4 at the beginning of the piercing phase and then drops to a lower pressure P3 at the start of the cutting phase (e.g., at the end of the piercing phase). Thus, from time $t_1$ to time $t_3$, the plasma gas pressure P4 may act on the workpiece with higher power (as compared to a plasma produced with plasma gas pressure P3) and quickly start to increase the pierce depth. Consequently, when the shield fluid is ramped at time $t_2$, the piercing from time $t_1$ to time $t_2$ will have likely already produced slag and the shield fluid ramping may serve to push the slag back into and/or away from the pierce hole. By comparison, in FIG. 8, the plasma gas pressure ramps from a first pressure P3 to a second pressure P4 in a stepped fashion at time $t_1$ (during the piercing phase) and the shield fluid ramping (from time $t_2$ to time $t_3$) lags behind the plasma gas ramping. Thus, the shield fluid ramping is closely tied to the plasma gas ramping and can ensure that any molten splatter or slag produced by increasing the plasma pressure is mitigated (or at the least the height of any such slag is minimize/mitigated) by an increase in the shield fluid pressure.

To be clear, FIGS. 7 and 8 are merely examples of manners in which the plasma gas pressure may be ramped during a piercing phase (i.e., in conjunction with a shield fluid pressure ramping). In other embodiments, the plasma gas pressure may increase in any manner (e.g., along any profile). For example, the plasma gas pressure may linearly or non-linearly increase starting at time $t_1$ or starting at time $t_2$. Additionally or alternatively, the plasma gas pressure could start increasing at a time between time $t_1$ and time $t_2$ so that the plasma gas pressure and the shield fluid both ramp after initiation of the piercing phase, but at different times during the piercing phase. However, when the plasma pressure increases in a stepped manner, this may create an abrupt change in plasma power that causes an expulsion of molten metal accumulated in the pierce prior to the step. The shield fluid ramping may counteract this expulsion and, thus, may be particularly suited for piercing schemes that include a stepped increase of the plasma gas pressure.

Still further, although not shown in some embodiments, the plasma gas pressure can be pulsed between pressures P1 and P2 during the piercing phase (e.g., with the shield fluid profile depicted in FIG. 6 or variations thereof, including stepped or smooth waves). Such pulsing causes the ionized plasma jet stream to strike against the workpiece at alternating high and low forces in a manner analogous to a jackhammer. This plasma pressure pulsing could also be matched with shield fluid pressure pulsing (e.g., as shown in FIG. 6) to provide slag control (e.g., movement or removal) during or between the "forward strokes of the jackhammer" (i.e., during the high-pressure pulses of plasma gas).

That all said, for the purposes of this application, the shield fluid ramping will only "lag" behind a plasma gas ramping if the plasma gas reaches elevated pressures prior to the shield fluid reaching elevated pressures. That is, "lagging" may describe the temporal relationship between the time when the plasma gas reaches its elevated pressure and the time when the shield fluid reaches its elevated pressure, with the former preceding the latter. But, the elevated pressures need not be the final elevated pressures. Thus, in some instances, the plasma pressure may still be ramping when the shield fluid pressure starts ramping, provided that the plasma pressure is ramping faster than shield fluid pressure (so that the shield fluid pressure ramping lags behind the plasma gas pressure ramping). For example, if the plasma pressure increases a decreasing rate from time $t_1$ to time $t_2$ may (e.g., over a decreasing hyperbolic curve), a linear fluid shield ramping over time $t_1$ to $t_2$ may lag behind this ramping. On the other hand, if the plasma pressure increases at an increasing rate from time $t_1$ to time $t_2$ (e.g., over an increasing hyperbolic curve), a linear fluid shield ramping over time $t_1$ to $t_2$ may not lag behind this ramping for the purposes of this application (since, the shield fluid pressure may initially ramp faster than the plasma gas pressure). However, to be clear, the lagging the shield fluid ramping presented herein does not require that the shield fluid ramping lag behind the plasma gas ramping and, instead, the shield fluid ramping can lag behind only initiation of the piercing phase. Alternatively, the shield fluid ramping presented herein can lag behind the plasma gas ramping for only a portion of the piercing phase.

Now turning to FIGS. 9-11, these Figures illustrate further variations of the above-described pressure schemes to illustrate how the plasma gas pressure and/or the shield fluid pressure may, in some embodiments, be decreased at the end of a piercing phase. Specifically, FIGS. 9 and 11 illustrate variations of FIG. 7 while FIG. 10 illustrates a variation of FIG. 3. Again, these Figures are merely examples of concepts that may incorporated into the techniques presented herein and are not intended to be limiting in any manner. Thus, although the concepts of FIGS. 9-11 are illustrated as variations of FIGS. 7 and 3, these concepts could also be utilized in combination with any of the concepts illustrated in FIGS. 3-8 or variations and/or combinations thereof. Generally, FIGS. 9-11 illustrate how the plasma gas pressure and/or the shield fluid pressure may be decreased at the end of a piercing phase because, in some instances, it may not be necessary to maintain high the high pressures that are beneficial for piercing during a cutting phase. Thus, decreasing the pressure of the plasma gas and/or the shield fluid may conserve resources or provide optimal conditions for certain cuts.

First turning to FIG. 9, in some embodiments, such as the embodiment depicted in FIG. 9, the plasma gas pressure may ramp down from pressure P4 to a lower pressure, such as pressure P3, while the shield fluid pressure ramps down from elevated pressure P2 to a lower pressure, such as pressure P1. To be clear, in FIGS. 9-11, pressures P3 and P1 are merely representative of pressures that are lower than an elevated pressure and the plasma gas pressure and/or the shield fluid pressure need not decrease to the same pressure from which it was ramped. Instead, the pressure of the shield fluid and/or the pressure of the plasma gas during cutting may be substantially equal to, higher than, or lower than the pre-elevated pressure (e.g., higher, lower, or substantially equal to pressure P1) and/or the elevated pressure (e.g., higher, lower, or substantially equal to pressure P2).

In FIG. 9, the pressure decreases occur during the cutting phase, e.g., after time $t_3$ and ramps down after being maintained at an elevated pressure P2 for a period of time spanning from time $t_3$ to time $t_6$. In some instances, period of time spanning from time $t_3$ to time $t_6$ may correspond to a lead-in time during which a torch is repositioned from a pierce to a cut starting point (e.g., to move away from the pierce hole before cutting a part). Additionally or alternatively, the time $t_3$ to time $t_6$ may correspond to a time in which the torch moves away from the immediate periphery of the pierce hole. After time $t_6$, the elevated pressure may no longer be needed and the shield fluid pressure may ramp down, for example, to conserve shield fluid resources.

Although the techniques presented herein will often minimize the amount of slag accumulating around a pierce hole, some slag may nevertheless accumulate around the pierce hole during formation of the pierce hole. This effectively increases the thickness of metal to be cut in the area surrounding the pierce hole and, thus, the plasma gas pressure and/or the shield fluid pressure may be maintained at elevated levels to improve the cutting efficiency through this slag and to ensure that slag formation is prevented or minimized for this thicker cut. Advantageously, this may reduce the amount of scrap metal produced (due to the minimization of slag) while also eliminating the need to maneuver around large metal pools, which, in turn, may reduce the overall cutting time. This also reduces the risk of the torch contacting metal pools, which can cause double arcing and damage to the torch consumables.

In FIG. 10, the shield fluid pressure also decreases during the cutting phase, e.g., after time $t_3$, but now it starts to ramp down in synchronization with the start of the cutting phase, over the period of time spanning from time $t_3$ to time $t_6$. In some embodiments, this may provide elevated shield fluid pressure during a lead-in cut (albeit decreasing) that enhances efficiency during a cut of a thicker metal (e.g., as caused by slag formation) while also maximizing conservation of shield fluid resources (since the ramp down occurs over the lead-in). However, in FIG. 10 the shield fluid pressure decreases without a corresponding decrease of the plasma gas pressure. In FIG. 10, the plasma gas pressure was not elevated during the piercing phase and, thus, the plasma gas pressure does not need to be decreased. Thus, decreasing the shield fluid pressure during the cutting phase may provide a shield fluid pressure that is efficient for the plasma gas pressure.

The scheme depicted in FIG. 11 is similar to the scheme of FIG. 10 because the shield fluid pressure decreases without a corresponding decrease of the plasma gas pressure. However, in FIG. 11, the gas pressure was elevated to pressure P4 during the piercing phase and is maintained at the elevated pressure P4 during the cutting phase. Moreover, in FIG. 11, the shield fluid pressure decreases during the piercing phase, e.g., before time $t_3$ and ramps over a period of time spanning from time $t_7$ to time $t_3$. That is, in FIG. 11, the shield fluid pressure is ramped up during the piercing phase and is also ramped down during the piercing phase. Thus, for example, if the cutting phase requires or would benefit from a shield fluid pressure that is lower than the elevated pressure P2, the shield fluid pressure will be adjusted accordingly in advance of the cutting phase and the cutting phase will be able to commence with optimal or beneficial settings immediately after termination of the piercing phase.

To be clear, while the ramp down transitions depicted in FIGS. 9-11 are all depicted as linear transitions, these ramp down transitions need not be linear. Instead, the transitions could be exponential, stepped, spiked, or otherwise non-linear (i.e., as shown in FIGS. 4-6 or any other non-linear profile). Moreover, these transitions need not include a single profile and could include any combination or variation of linear and/or non-linear profiles, including pulsed or spiking profiles. Still further, any of the transitions depicted in FIGS. 9-11, or variations thereof, could be combined in any manner.

Now turning to FIG. 12, this Figure depicts a graph that is a variation of FIG. 3 where the main cutting current ramp up time is extended to occur over a longer period of time. The faster ramp rate of FIG. 3 is more appropriate for piercing and cutting metals, such as stainless steel and aluminum, with a non-oxygen containing plasma and shield fluids. Examples of non-oxidizing gases are nitrogen and $H_{35}$ (35% hydrogen/65% argon mixture). The lower ramp rate of FIG. 12 may be more appropriate for cutting and piercing ferrous metals, such mild steel, with oxygen containing plasma and shield fluids. Examples of oxidizing gases are air and oxygen. The type of emitter 85 used in the plasma torch also affects the selection of an appropriate ramp up time. For example, when the emitter 85 is tungsten it does not tend to wear significantly when a nitrogen plasma jet stream is used to cut, for example, a stainless steel workpiece. As such, higher current ramp up rates, or even a stepped increase in main cutting current (not shown), is appropriate since it will not significantly affect the life of the electrode 82. However, when the emitter is hafnium, a hafnium puddle typically exists at the tip of the electrode at the end of the pilot phase. In such a situation, if the main cutting current is ramped up too fast it can result in the hafnium puddle being blown out the plasma torch nozzle. If this occurs, the life of the electrode is significantly reduced.

To be clear, FIG. 12 is merely an example of a concept that may incorporated into the techniques presented herein and is not intended to be limiting in any manner. Thus, although the FIG. 12 illustrates a concept as a variation of FIG. 3, this concept could also be utilized in combination with any of the concepts illustrated in FIGS. 3-11 or variations and/or combinations thereof.

Figure 13:
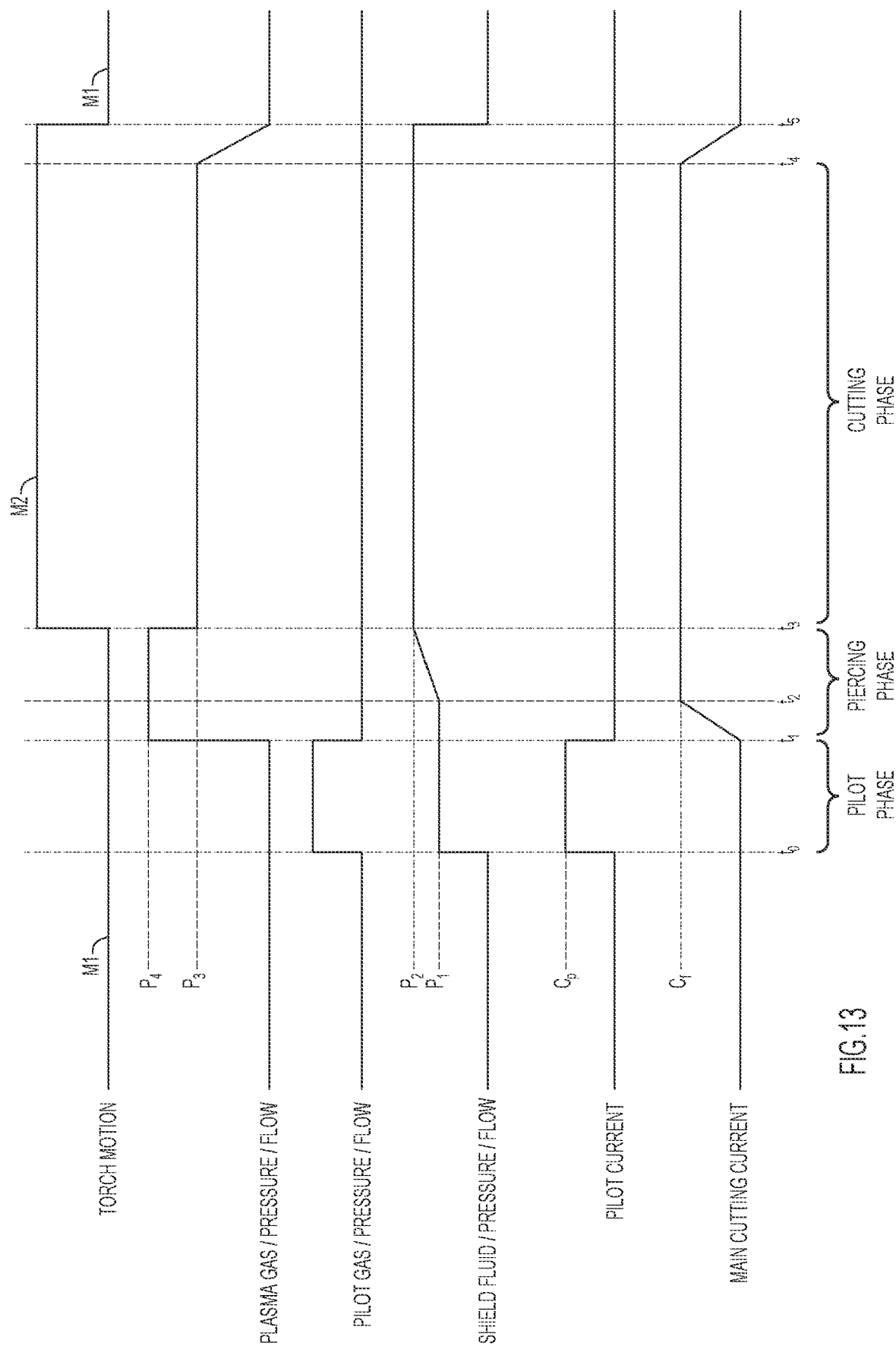
FIGS. 13-15 are graphs like that of FIG. 3 that further shows an initiation of a movement of the plasma torch away from the pierce hole at the end of the piercing phase, with the shield fluid controlled similar to the manners shown in FIGS. 3, 11, and 9, respectively.
Figure 14:
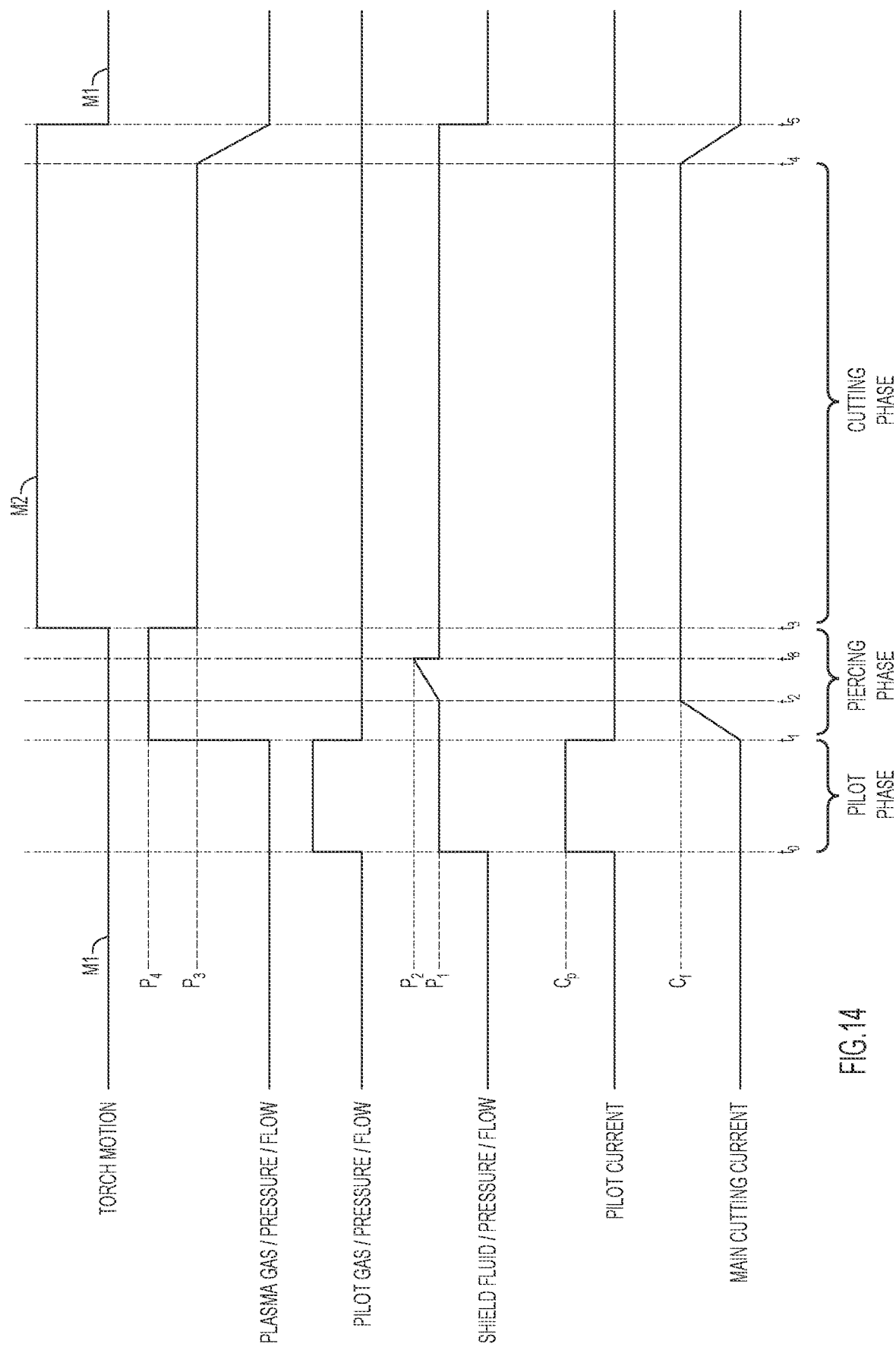
Figure 15:
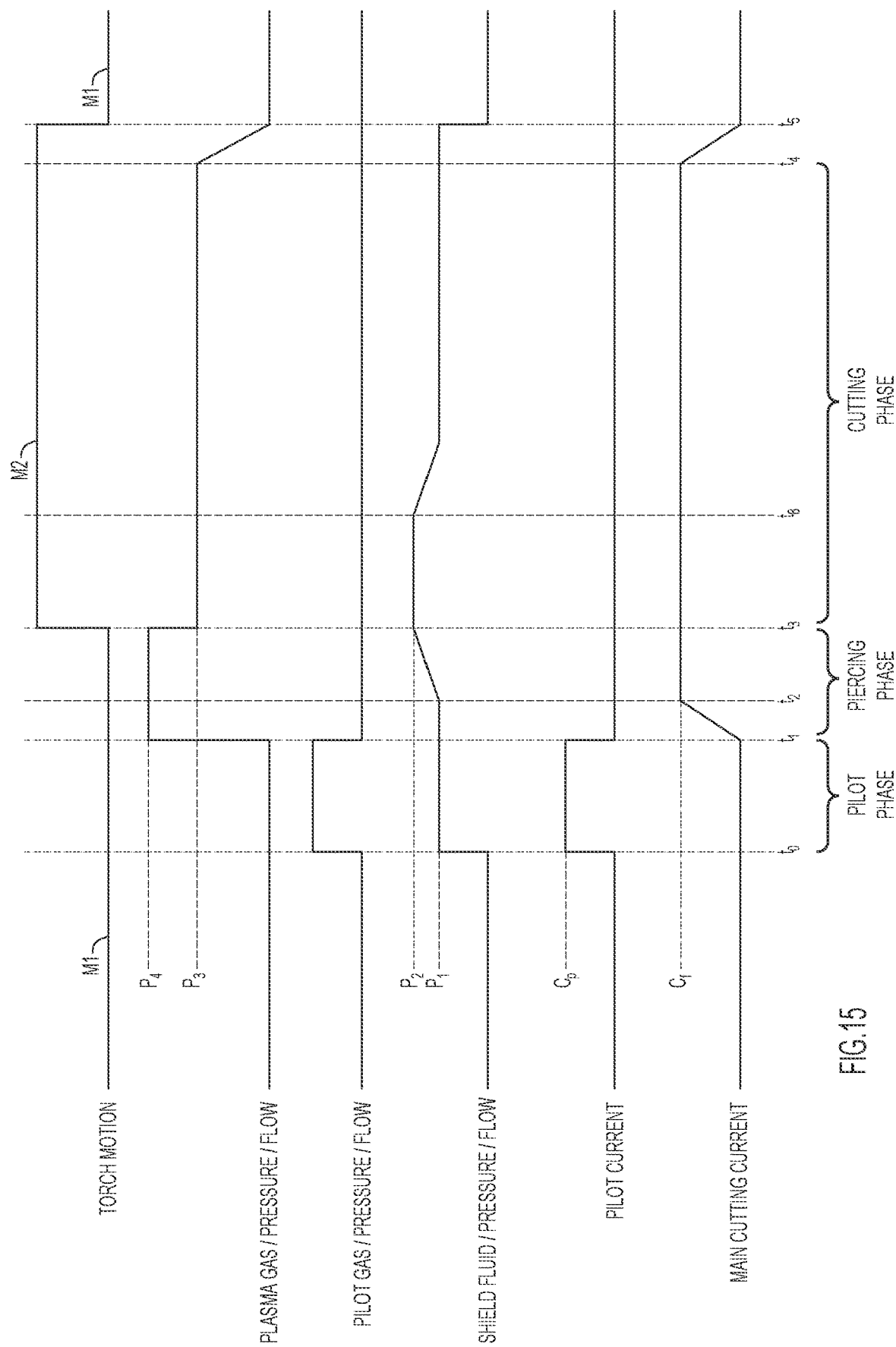

FIGS. 13-15 provide graphs that are variations of the graph of FIG. 3 including an illustration of movement of the plasma torch (e.g., away from a boundary of the pierce hole). In FIGS. 13-15, this movement of the plasma torch is denoted by the line labeled "Torch Motion." The lines labeled M1 represent times when the plasma torch in a stationary state in relation to a movement along a length and/or width of the workpiece (e.g., in an X- or Z-direction of a cutting table). Line M2 represents the plasma torch being in horizontal motion above the top surface of the workpiece (e.g., in the X-Z plane). However, the Torch Motion line provides no information with respect to a height or angular orientation of the torch, which may vary in accordance with any techniques now known or developed hereafter. Thus, the Torch Motion line is simply intended to illustrate when the torch might move away from a boundary of the pierce hole. Moreover, the movement schemes illustrated in FIGS. 13-15 merely illustrate example movement schemes and are not intended to be limiting in any manner. For example, in some embodiments, the torch may be moving in horizontal motion above the top surface of the workpiece (e.g., in the X-Z plane) during a pierce, or at least during a portion of a pierce.

In the implementation of FIG. 13, the plasma torch remains stationary (motion M1) during the piercing phase and is then set in motion (motion M2) in a lengthwise and/or widthwise direction of the workpiece away from the pierce hole at time $t_3$ coincident with the termination of the piercing phase and the beginning of the cutting phase. To reiterate, during the M1 stationary state the height of the torch and or the angle of the torch may be varied. For example, while the pierce hole is being produced the height of the torch may be varied as the depth of the pierce hole increases and/or the angle of the torch may be varied to achieve a bevel cut. Notwithstanding the foregoing example, in instances of the workpiece comprising a cylindrical form, such as a pipe, line M2 represents the plasma torch being in circumferential motion around the pipe. Moreover, as mentioned, in some embodiments, the torch may be moving in horizontal motion above the top surface of the workpiece (e.g., in the X-Z plane) during a pierce, or at least during a portion of a pierce.

FIGS. 14 and 15 are similar to the graph of FIG. 13, but illustrate the torch motion when the shield fluid pressure is not maintained at an elevated current throughout the cutting phase. Specifically, FIG. 14 shows the shield fluid pressure ramping down during the piercing phase while FIG. 15 shows the shield fluid pressure ramping down during the cutting phase (e.g., similar, but not necessarily identical, to FIGS. 11 and 9, respectively). Notably, in both of these variations, the plasma torch still remains stationary (motion M1) during the piercing phase and is still set in motion (motion M2) in a lengthwise and/or widthwise direction of the workpiece away from the pierce hole at time $t_3$ coincident with the termination of the piercing phase and the beginning of the cutting phase. Nevertheless, again, in some embodiments, the torch may be moving in horizontal motion above the top surface of the workpiece (e.g., in the X-Z plane) during a pierce, or at least during a portion of a pierce.

Figure 16:
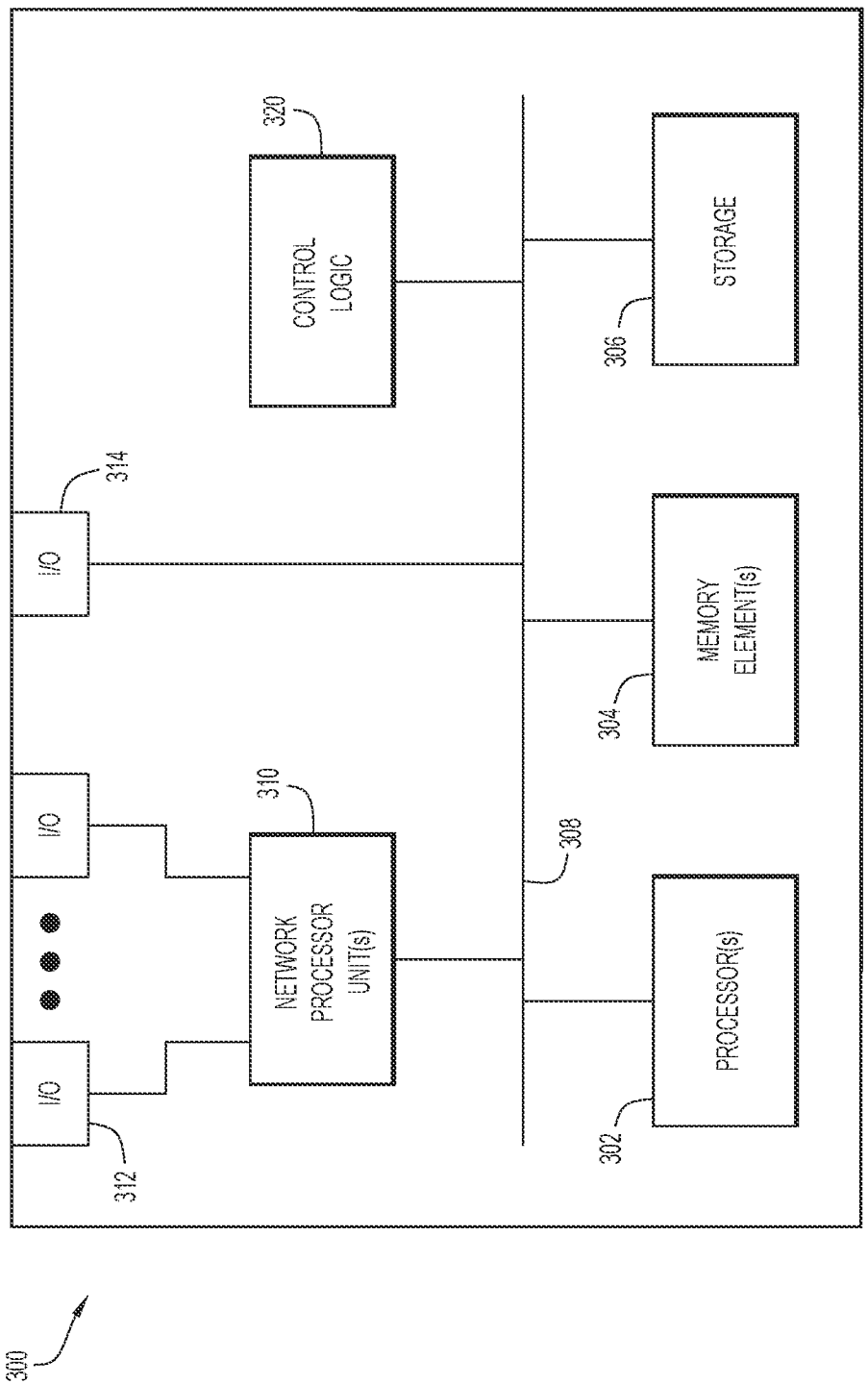
FIG. 16 illustrates a hardware block diagram of a computing device that may execute the techniques presented herein.

Now turning to FIG. 16, this Figure illustrates a hardware block diagram of a computing device 300 that may execute the techniques presented herein. This computing device 300 may be included in or formed from portions of any combination of parts included in the controller 16, the automated plasma arc torch 18, the power supply 14, and/or the positioning system 12 of an automated cutting system 10. Thus, any of the controller 16, the automated plasma arc torch 18, the power supply 14, and/or the positioning system 12 of an automated cutting system 10 may execute the techniques presented herein, alone or in combination with one or more other systems/components.

As depicted, the computing device 300 includes a bus 308, which provides communications between computer processor(s) 302, one or more memory elements 304, persistent storage 306, one or more network processor units 310 (i.e., a communications unit), and input/output (I/O) interface(s) 314. Bus 308 can be implemented with any architecture designed for passing data and/or control information between processors (such as microprocessors, communications and network processors, etc.), system memory, peripheral devices, and any other hardware components within a system. For example, bus 308 can be implemented with one or more buses.

Memory 306 and/or memory element 304 may include random access memory (RAM) or other dynamic storage devices (i.e., dynamic RAM (DRAM), static RAM (SRAM), and synchronous DRAM (SD RAM)), for storing information and instructions to be executed by processor 302. The memory 306 and/or memory element 304 may also include a read only memory (ROM) or other static storage device (i.e., programmable ROM (PROM), erasable PROM (EPROM), and electrically erasable PROM (EEPROM)) for storing static information and instructions for the processor 302. Additionally, although "control logic" 320 is illustrated separately from memory 306 and/or memory element 304, the control logic 320 may be stored as non-transitory computer readable instructions in memory 306 and/or memory element 304, for execution by processor 302 so that processor 302 can execute the techniques presented herein.

Although FIG. 16 shows the processor 302 as a single box, it should be understood that the processor 302 may represent a plurality of processing cores, each of which can perform separate processing. The processor 302 may also include special purpose logic devices (i.e., application specific integrated circuits (ASICs)) or configurable logic devices (i.e., simple programmable logic devices (SPLDs), complex programmable logic devices (CPLDs), and field programmable gate arrays (FPGAs)), that, in addition to microprocessors and digital signal processors may individually, or collectively, are types of processing circuitry.

The processor 302 performs a portion or all of the processing steps required to execute the techniques presented herein, e.g., in response to instructions received at network processor unit(s) 310 and/or instructions contained in memory 304 and/or memory 306. Such instructions may be read into memory 304 and/or memory 306 from another computer readable medium. One or more processors in a multi-processing arrangement may also be employed to execute the sequences of instructions contained in memory 304 and/or memory 306. In alternative embodiments, hardwired circuitry may be used in place of or in combination with software instructions. Thus, embodiments are not limited to any specific combination of hardware circuitry and software. Put another way, the computing device 300 includes at least one computer readable medium or memory for holding instructions programmed according to the embodiments presented, for containing data structures, tables, records, or other data described that might be required to execute the techniques presented herein.

Still referring to FIG. 16, the network processor unit(s) 310 provides a two-way data communication coupling to a network, such as a local area network (LAN) or the Internet. The two-way data communication coupling provided by the network processor unit(s) 310 can be wired (e.g., via I/O interface(s) 312) or wireless. Meanwhile, I/O interface(s) 314 may allow for input and output of data with other devices that may be connected to computer device 300. For example, I/O interface 314 may provide a connection to external devices such as a keyboard, keypad, a touch screen, and/or some other suitable input device. External devices can also include portable computer readable storage media such as database systems, thumb drives, portable optical or magnetic disks, and memory cards.

While this application has described the techniques presented herein in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Finally, for the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

What is claimed is:

1. A method for piercing and cutting a workpiece using a plasma torch that includes an electrode, a nozzle, and a shield, the nozzle being spaced from and surrounding a distal end portion of the electrode to form a plasma gas flow channel, and the shield being spaced from and surrounding a distal end portion of the nozzle to form a shield flow channel, the method comprising:
    delivering a plasma gas through the plasma gas flow channel while ionizing the plasma gas to produce a plasma arc that extends between the electrode and the workpiece;
    delivering a shield fluid through the shield flow channel at a first pressure;
    initiating a piercing operation to produce a pierce hole in the workpiece using the plasma arc while the shield fluid is delivered through the shield flow channel at the first pressure;
    after conducting the piercing operation for an amount of time, delivering the shield fluid to the shield flow channel at a second pressure that is higher than the first pressure;
    after the amount of time, delivering the shield fluid to the shield flow channel at another pressure that is different from the first pressure, the second pressure, or both the first pressure and the second pressure; and
    subsequent to the piercing operation, performing a cutting operation that forms a cut in the workpiece that originates at and extends away from a boundary of the pierce hole.

2. The method according to claim 1, wherein the first pressure is 10% to 50% lower than the second pressure.

3. The method according to claim 1, wherein the first pressure transitions linearly to the second pressure.

4. The method according to claim 1, wherein the first pressure transitions non-linearly to the second pressure.

5. The method according to claim 1, further comprising:
    maintaining the shield fluid at the second pressure during at least a portion of the cutting operation.

6. The method according to claim 1, further comprising:
    delivering the plasma gas through the plasma gas flow channel at a third pressure during the piercing operation; and
    delivering the plasma gas through the plasma gas flow channel at a fourth pressure that is lower than the third pressure during the cutting operation.

7. The method according to claim 6, wherein during the piercing operation the plasma gas is ramped up in pressure from a pressure below the third pressure to the third pressure.

8. The method according to claim 6, wherein the plasma gas is ramped up in pressure prior to delivery of the shield fluid to the shield flow channel at the second pressure.

9. The method according to claim 6, wherein the plasma gas is ramped up in pressure in synchronization with a ramping of the shield fluid from the first pressure to the second pressure.

10. The method according to claim 7, wherein the plasma gas is ramped up in pressure in a linear manner.

11. The method according to claim 7, wherein the plasma gas is ramped up in pressure in a non-linear manner.

12. A method for piercing and cutting a workpiece using a plasma torch that includes an electrode, a nozzle, and a shield, the nozzle being spaced from and surrounding a distal end portion of the electrode to form a plasma gas flow channel, and the shield being spaced from and surrounding a distal end portion of the nozzle to form a shield flow channel, the method comprising:
  during a first time, delivering a plasma gas through the plasma gas flow channel and ionizing the plasma gas to produce a pilot arc;
  after the first time, delivering the plasma gas through the plasma gas flow channel to initiate a piercing operation that produces a pierce hole in the workpiece during a second time, the piercing operation extends across the second time and a third time;
  delivering, at the first time, a shield fluid through the shield flow channel at a first pressure;
  delivering, during at least a portion of the second time, the shield fluid through the shield flow channel at a second pressure, the second pressure being greater than the first pressure;
  during the third time, delivering the shield fluid through the shield flow channel at a third pressure that is different from the first pressure, the second pressure, or both the first pressure and the second pressure; and
  subsequent to the piercing operation, performing a cutting operation that forms a cut in the workpiece that originates at and extends away from a boundary of the pierce hole, wherein, during the cutting operation, the shield fluid is delivered through the shield flow channel at a shield cutting pressure substantially equal to or greater than the second pressure.

13. The method according to claim 12, wherein the second time precedes the third time and the third pressure is greater than the second pressure.

14. The method according to claim 12, wherein the second time precedes the third time and the third pressure is lower than the second pressure.

15. The method according to claim 12, wherein the piercing operation extends across the second time, the third time, and a fourth time, and the method further comprises:
  during the fourth time, delivering the shield fluid through the shield flow channel at a fourth pressure that is different from the first pressure, the second pressure, the third pressure, or any combination of the first pressure, the second pressure, and the third pressure.

16. The method according to claim 12, wherein the shield fluid is delivered through the shield flow channel at the second pressure during substantially all of the second time.

17. The method according to claim 12, wherein each of the first pressure and the second pressure is lower than the shield cutting pressure.

18. The method according to claim 12, wherein during the piercing operation the shield fluid is delivered to the shield flow channel at the first pressure and the second pressure in an alternating manner.

19. A method for piercing and cutting a workpiece using a plasma torch that includes an electrode, a nozzle, and a shield, the nozzle being spaced from and surrounding a distal end portion of the electrode to form a plasma gas flow channel, and the shield being spaced from and surrounding a distal end portion of the nozzle to form a shield flow channel, the method comprising:
  during a first time, delivering a plasma gas through the plasma gas flow channel and ionizing the plasma gas to produce a pilot arc;
  after the first time, delivering the plasma gas through the plasma gas flow channel to initiate a piercing operation that produces a pierce hole in the workpiece during a second time;
  delivering, at the first time, a shield fluid through the shield flow channel at a first pressure;
  delivering, during at least a portion of the second time, the shield fluid through the shield flow channel at a second pressure, the second pressure being greater than the first pressure; and
  subsequent to the piercing operation, performing a cutting operation that forms a cut in the workpiece that originates at and extends away from a boundary of the pierce hole, wherein, during the cutting operation, the shield fluid is delivered through the shield flow channel at a shield cutting pressure substantially equal to the second pressure.

20. The method according to claim 19, wherein the shield fluid is delivered through the shield flow channel at the second pressure during substantially all of the second time.

* * * * *